United States Patent
Hasek

(10) Patent No.: US 10,516,755 B2
(45) Date of Patent: Dec. 24, 2019

(54) APPARATUS AND METHODS FOR ENSURING DELIVERY OF GEOGRAPHICALLY RELEVANT CONTENT

(71) Applicant: Time Warner Cable Enterprises LLC, St. Louis, MO (US)

(72) Inventor: Charles Hasek, Westminster, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/898,485

(22) Filed: Feb. 17, 2018

(65) Prior Publication Data

US 2018/0241840 A1 Aug. 23, 2018

Related U.S. Application Data

(63) Continuation of application No. 14/486,983, filed on Sep. 15, 2014, now Pat. No. 9,900,401, which is a
(Continued)

(51) Int. Cl.
*H04L 29/08* (2006.01)
*H04L 29/06* (2006.01)
(Continued)

(52) U.S. Cl.
CPC .......... *H04L 67/32* (2013.01); *G06F 21/10* (2013.01); *H04L 65/4084* (2013.01);
(Continued)

(58) Field of Classification Search
CPC ..... H04L 65/4084; H04L 67/18; H04L 67/32; H04N 21/2225; H04N 21/2541;
(Continued)

(56) References Cited

U.S. PATENT DOCUMENTS

| 6,016,316 A | 1/2000 | Moura et al. |
| 6,769,127 B1 | 7/2004 | Bonomi et al. |

(Continued)

FOREIGN PATENT DOCUMENTS

| WO | WO-2010008487 A1 | 1/2010 |
| WO | WO-2011035443 A1 | 3/2011 |
| WO | WO-2011053858 A1 | 5/2011 |

OTHER PUBLICATIONS

Apple Inc., HTTP Live Streaming Overview, Apr. 1, 2011.
(Continued)

*Primary Examiner* — Kashif Siddiqui
(74) *Attorney, Agent, or Firm* — Gazdzinski & Associates, PC

(57) ABSTRACT

Apparatus and methods for ensuring delivery of geographically relevant content to IP-enabled user devices associated with a content distribution network. In one embodiment, the network (or designated content source) determines a geographic context or location of the user device, and uses this information to manage the packaging and delivery of content thereto so as to obey blackout restrictions and/or provide content which is relevant to the geographic context/location. In one variant, the user device comprises a mobile device such as a tablet computer or smartphone, and the content is delivered thereto over either a managed or unmanaged network infrastructure.

22 Claims, 14 Drawing Sheets

Related U.S. Application Data continuation of application No. 13/437,621, filed on Apr. 2, 2012, now Pat. No. 8,838,149.

(51) Int. Cl.
*H04N 21/2225* (2011.01)
*H04N 21/254* (2011.01)
*H04N 21/258* (2011.01)
*H04N 21/61* (2011.01)
*G06F 21/10* (2013.01)

(52) U.S. Cl.
CPC ......... *H04L 67/18* (2013.01); *H04N 21/2225* (2013.01); *H04N 21/2541* (2013.01); *H04N 21/25816* (2013.01); *H04N 21/25841* (2013.01); *H04N 21/6125* (2013.01)

(58) Field of Classification Search
CPC ....... H04N 21/25816; H04N 21/25841; H04N 21/6125; H04W 4/02
See application file for complete search history.

(56) References Cited

U.S. PATENT DOCUMENTS

| | | |
|---|---|---|
| 6,917,614 B1 | 7/2005 | Laubach et al. |
| 6,917,641 B2 | 7/2005 | Kotzin et al. |
| 7,174,126 B2 | 2/2007 | McElhatten et al. |
| 7,457,520 B2 | 11/2008 | Rosetti et al. |
| 7,592,912 B2 | 9/2009 | Hasek et al. |
| 7,602,820 B2 | 10/2009 | Helms et al. |
| 7,763,360 B2 | 7/2010 | Paul et al. |
| 7,954,131 B2 | 5/2011 | Cholas et al. |
| 8,024,762 B2 | 9/2011 | Britt |
| 8,073,460 B1 | 12/2011 | Scofield et al. |
| 8,078,696 B2 | 12/2011 | Lajoie et al. |
| 8,090,014 B2 | 1/2012 | Cheung et al. |
| 8,090,104 B2 | 1/2012 | Wajs et al. |
| 8,095,610 B2 | 1/2012 | Gould et al. |
| 8,099,757 B2 | 1/2012 | Riedl et al. |
| 8,151,294 B2 | 4/2012 | Carlucci et al. |
| 8,181,209 B2 | 5/2012 | Hasek et al. |
| 8,214,256 B2 | 7/2012 | Riedl et al. |
| 8,280,982 B2 | 10/2012 | La et al. |
| 8,341,242 B2 | 12/2012 | Dillon et al. |
| 8,396,055 B2 | 3/2013 | Patel et al. |
| 8,472,371 B1 | 6/2013 | Bari et al. |
| 8,516,529 B2 | 8/2013 | Lajoie et al. |
| 8,561,116 B2 | 10/2013 | Hasek |
| 8,838,149 B2 | 9/2014 | Hasek |
| 9,021,566 B1 | 4/2015 | Panayotopoulos et al. |
| 9,400,875 B1* | 7/2016 | Barraclough ........... G06F 21/10 |
| 9,906,838 B2 | 2/2018 | Cronk et al. |
| 2003/0056217 A1 | 3/2003 | Brooks |
| 2003/0086422 A1 | 5/2003 | Klinker et al. |
| 2003/0123465 A1 | 7/2003 | Donahue |
| 2003/0145329 A1 | 7/2003 | Candelore |
| 2004/0003400 A1 | 1/2004 | Carney et al. |
| 2004/0083177 A1 | 4/2004 | Chen et al. |
| 2005/0002638 A1 | 1/2005 | Putterman et al. |
| 2005/0028208 A1 | 2/2005 | Ellis et al. |
| 2005/0034171 A1 | 2/2005 | Benya |
| 2006/0059532 A1 | 3/2006 | Dugan et al. |
| 2006/0128397 A1 | 6/2006 | Choti et al. |
| 2006/0139379 A1 | 6/2006 | Toma et al. |
| 2006/0165082 A1 | 7/2006 | Pfeffer et al. |
| 2007/0014293 A1 | 1/2007 | Filsfils et al. |
| 2007/0022459 A1 | 1/2007 | Gaebel, Jr. et al. |
| 2007/0033531 A1 | 2/2007 | Marsh |
| 2007/0088852 A1 | 4/2007 | Levkovitz |
| 2007/0094691 A1 | 4/2007 | Gazdzinski |
| 2007/0136777 A1 | 6/2007 | Hasek et al. |
| 2007/0157228 A1 | 7/2007 | Bayer et al. |
| 2007/0199019 A1 | 8/2007 | Angiolillo et al. |
| 2007/0204308 A1 | 8/2007 | Nicholas et al. |
| 2007/0217436 A1 | 9/2007 | Markley et al. |
| 2007/0276925 A1* | 11/2007 | La Joie ............ G06Q 30/0256 709/219 |
| 2008/0027801 A1 | 1/2008 | Walter et al. |
| 2008/0066095 A1 | 3/2008 | Reinoso |
| 2008/0092058 A1 | 4/2008 | Afergan et al. |
| 2008/0109853 A1 | 5/2008 | Einarsson et al. |
| 2008/0168487 A1 | 7/2008 | Chow et al. |
| 2008/0184344 A1 | 7/2008 | Hernacki et al. |
| 2008/0189617 A1 | 8/2008 | Covell et al. |
| 2008/0200154 A1 | 8/2008 | Maharajh et al. |
| 2008/0201736 A1 | 8/2008 | Gordon et al. |
| 2008/0215755 A1 | 9/2008 | Farber et al. |
| 2008/0235746 A1 | 9/2008 | Peters et al. |
| 2008/0256615 A1 | 10/2008 | Schlacht et al. |
| 2009/0006211 A1 | 1/2009 | Perry et al. |
| 2009/0076898 A1 | 3/2009 | Wang et al. |
| 2009/0077583 A1 | 3/2009 | Sugiyama et al. |
| 2009/0083279 A1 | 3/2009 | Hasek |
| 2009/0094347 A1 | 4/2009 | Ting et al. |
| 2009/0119703 A1 | 5/2009 | Piepenbrink et al. |
| 2009/0132347 A1 | 5/2009 | Anderson et al. |
| 2009/0187939 A1 | 7/2009 | Lajoie |
| 2009/0187941 A1 | 7/2009 | Smith |
| 2009/0210899 A1 | 8/2009 | Lawrence-Apfelbaum et al. |
| 2009/0228941 A1 | 9/2009 | Russell et al. |
| 2009/0248794 A1 | 10/2009 | Helms et al. |
| 2009/0327057 A1 | 12/2009 | Redlich |
| 2010/0027787 A1 | 2/2010 | Benkert et al. |
| 2010/0036720 A1 | 2/2010 | Jain et al. |
| 2010/0046927 A1 | 2/2010 | Manthoulis et al. |
| 2010/0082635 A1 | 4/2010 | Elsner et al. |
| 2010/0115540 A1 | 5/2010 | Fan et al. |
| 2010/0121936 A1 | 5/2010 | Liu et al. |
| 2010/0131973 A1 | 5/2010 | Dillon et al. |
| 2010/0132003 A1 | 5/2010 | Bennett et al. |
| 2010/0146541 A1 | 6/2010 | Velazquez |
| 2010/0151882 A1* | 6/2010 | Gillies ................. H04W 4/029 455/456.1 |
| 2010/0162367 A1 | 6/2010 | Lajoie et al. |
| 2010/0169503 A1 | 7/2010 | Kollmansberger et al. |
| 2010/0186029 A1 | 7/2010 | Kim et al. |
| 2010/0251304 A1 | 9/2010 | Donoghue et al. |
| 2010/0262461 A1 | 10/2010 | Bohannon |
| 2010/0262999 A1 | 10/2010 | Curran |
| 2010/0313225 A1 | 12/2010 | Cholas et al. |
| 2010/0333137 A1 | 12/2010 | Hamano et al. |
| 2011/0015989 A1 | 1/2011 | Tidwell et al. |
| 2011/0016479 A1 | 1/2011 | Tidwell et al. |
| 2011/0055866 A1 | 3/2011 | Piepenbrink et al. |
| 2011/0058675 A1 | 3/2011 | Brueck et al. |
| 2011/0083069 A1 | 4/2011 | Paul et al. |
| 2011/0083144 A1 | 4/2011 | Bocharov et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0138064 A1 | 6/2011 | Rieger et al. |
| 2011/0154383 A1 | 6/2011 | Hao et al. |
| 2011/0223944 A1 | 9/2011 | Gosselin |
| 2011/0231660 A1 | 9/2011 | Kanungo |
| 2011/0246616 A1 | 10/2011 | Ronca et al. |
| 2011/0258049 A1 | 10/2011 | Ramer et al. |
| 2011/0264530 A1 | 10/2011 | Santangelo et al. |
| 2011/0265116 A1 | 10/2011 | Stern et al. |
| 2011/0302624 A1 | 12/2011 | Chen et al. |
| 2012/0008786 A1 | 1/2012 | Cronk et al. |
| 2012/0011567 A1 | 1/2012 | Cronk et al. |
| 2012/0072526 A1 | 3/2012 | Kling et al. |
| 2012/0076015 A1 | 3/2012 | Pfeffer |
| 2012/0079523 A1 | 3/2012 | Trimper et al. |
| 2012/0089699 A1 | 4/2012 | Cholas |
| 2012/0096106 A1 | 4/2012 | Blumofe et al. |
| 2012/0124612 A1 | 5/2012 | Adimatyam et al. |
| 2012/0137332 A1 | 5/2012 | Kumar |
| 2012/0144195 A1 | 6/2012 | Nair et al. |
| 2012/0151077 A1 | 6/2012 | Finster |
| 2012/0167132 A1 | 6/2012 | Mathews et al. |
| 2012/0170544 A1 | 7/2012 | Cheng et al. |

(56) References Cited

U.S. PATENT DOCUMENTS

| | | |
|---|---|---|
| 2012/0170741 A1 | 7/2012 | Chen et al. |
| 2012/0173746 A1 | 7/2012 | Salinger et al. |
| 2012/0174150 A1* | 7/2012 | Reddy ............. H04N 21/25841 |
| | | 725/31 |
| 2012/0185693 A1 | 7/2012 | Chen et al. |
| 2012/0197980 A1 | 8/2012 | Terleski et al. |
| 2012/0246462 A1 | 9/2012 | Moroney et al. |
| 2012/0278833 A1 | 11/2012 | Tam et al. |
| 2012/0284804 A1 | 11/2012 | Lindquist et al. |
| 2012/0308071 A1 | 12/2012 | Ramsdell et al. |
| 2012/0324552 A1 | 12/2012 | Padala et al. |
| 2013/0024901 A1 | 1/2013 | Sharif-Ahmadi et al. |
| 2013/0029716 A1 | 1/2013 | Lee et al. |
| 2013/0031578 A1 | 1/2013 | Zhu et al. |
| 2013/0046849 A1 | 2/2013 | Wolf et al. |
| 2013/0132986 A1 | 5/2013 | Mack et al. |
| 2013/0133010 A1 | 5/2013 | Chen |
| 2013/0166906 A1 | 6/2013 | Swaminathan et al. |
| 2013/0174271 A1 | 7/2013 | Handal et al. |
| 2013/0179588 A1 | 7/2013 | McCarthy et al. |
| 2013/0198770 A1 | 8/2013 | Xiong et al. |
| 2013/0219178 A1 | 8/2013 | Xiques et al. |
| 2013/0227283 A1 | 8/2013 | Williamson et al. |
| 2013/0227284 A1 | 8/2013 | Pfeffer et al. |
| 2014/0012843 A1 | 1/2014 | Soon-Shiong |
| 2014/0033252 A1* | 1/2014 | Radloff ................. H04N 5/445 |
| | | 725/35 |
| 2014/0230003 A1 | 8/2014 | Ma et al. |
| 2014/0245341 A1 | 8/2014 | Mack et al. |
| 2014/0259182 A1 | 9/2014 | Mershon |
| 2015/0109122 A1 | 4/2015 | Stern et al. |
| 2015/0163540 A1 | 6/2015 | Masterson |
| 2015/0195373 A1 | 7/2015 | Hasek et al. |
| 2016/0241617 A1 | 8/2016 | Jelley et al. |
| 2017/0048357 A1 | 2/2017 | Pfeffer et al. |

OTHER PUBLICATIONS

OpenCable Specifications, Alternate Content, Real-Time Event Signaling and Management API, OC-SP-ESAM-API-I01-120910 (2012).
SCTE American National Standard AMSI/SCTE 118-2 2007.
SCTE American National Standard ANSI/SCTE 130-1 2008.
SCTE, American National Standard, ANSI/SCTE 35 2012.
Zarnbelli, The Apparatus and Methods of HS Smooth Streaming Technical Overview, Mar. 2009.

* cited by examiner

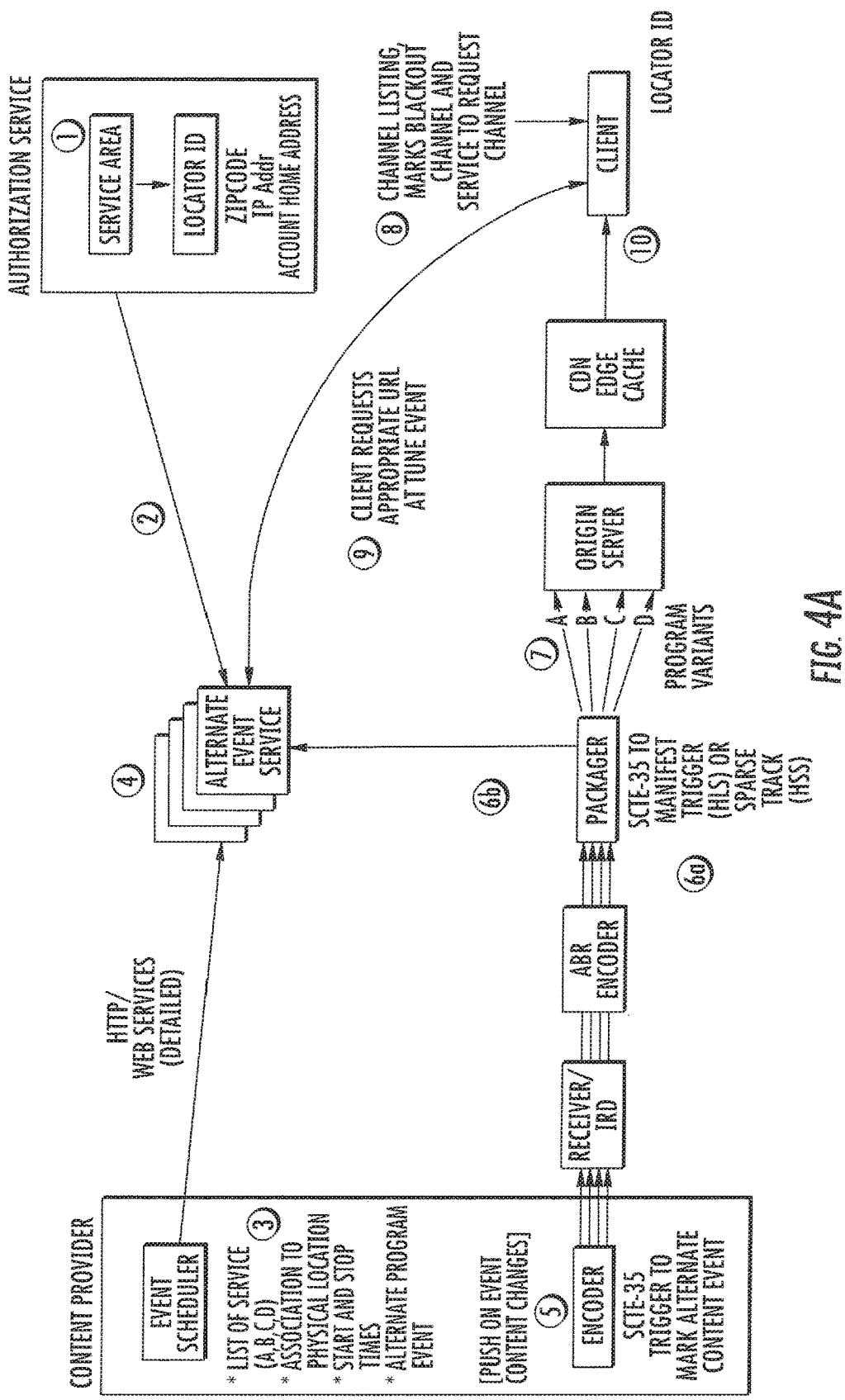

APPARATUS AND METHODS FOR ENSURING DELIVERY OF GEOGRAPHICALLY RELEVANT CONTENT

PRIORITY AND RELATED APPLICATIONS

This application is a continuation of and claims priority to U.S. patent application Ser. No. 14/486,983, of the same title and filed on Sep. 15, 2014, issuing as U.S. Pat. No. 9,900,401 on Feb. 20, 2018, which is a continuation of and claims priority to U.S. patent application Ser. No. 13/437,621, of the same title and filed on Apr. 2, 2012, now issued as U.S. Pat. No. 8,838,149 on Sep. 16, 2014, each of which is incorporated herein by reference in its entirety. The present invention is related to U.S. patent application Ser. No. 13/403,802 filed on Feb. 23, 2012 and entitled "APPARATUS AND METHODS FOR PROVIDING CONTENT TO AN IP-ENABLED DEVICE IN A CONTENT DISTRIBUTION NETWORK"; co-owned U.S. patent application Ser. No. 13/403,814 filed on Feb. 23, 2012 and entitled "APPARATUS AND METHODS FOR CONTENT DISTRIBUTION TO PACKET-ENABLED DEVICES VIA A NETWORK BRIDGE", now issued as U.S. Pat. No. 9,426,123 on Aug. 23, 2106; and co-owned U.S. patent application Ser. No. 12/766,753 filed on Apr. 23, 2010 and entitled "ZONE CONTROL METHODS AND APPARATUS", which is now issued as U.S. Pat. No. 8,701,138 on Apr. 15, 2014, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data and content distribution and delivery via a content distribution or other network. In one exemplary aspect, the invention relates to the delivery of content which is geographically relevant to an Internet Protocol (IP) enabled device.

2. Description of Related Technology

Content distribution networks (such as e.g., Cable Television (CATV), satellite, or hybrid fiber/copper (HFCu) systems) provide content from various content sources at a network headend to a plurality of subscriber devices. In a typical "managed" network, a network operator (e.g., multiple systems operator or MSO) provides access to content via the network. Generally, the MSO provides audio/video content to subscribers via the network headend.

Recent advances in digital information processing and technology have made a broad range of services and functions available for delivery to consumers at various types of devices for very reasonable prices (or subscription fees). These services and functions include delivery of digital content or programming (movies, etc.), digital video-on-demand (VOD) services, personal video recorder (PVR) and networked PVR (nPVR) services, Internet Protocol television (IPTV), digital media playback and recording, as well high speed Internet access (including so-called "Internet TV", where television programming is delivered over the Internet with or without QoS) and IP-based telephony (e.g., VoIP). Other services available to network users include without limitation access to, and recording of, digital music (e.g., MP3 files), and submission of user-generated media (e.g., home-grown Youtube™ videos, etc.).

Currently, many of these services are provided to users via a variety of different equipment environments and delivery paradigms including, inter alia, cable or satellite modems or QAMs, HFCu (i.e., Hybrid Fiber-copper distribution via indigenous POST/PSTN and/or coaxial wiring in a premises), optical fiber such as FTTC, FTTH, etc., Wi-Fi™ hubs, WiMAX (802.16) and cellular wireless networks, Ethernet hubs, gateways, switches, and routers, and to a plurality of user equipment types (e.g., set-top boxes, personal (desktop) computers, laptop computers, other mini-computers such as so-called "netbooks" and mini-notebook computers, and/or other devices). Recent advances in consumer electronics have also led to the widespread introduction of a variety of portable media devices (PMDs) such as, inter alia, portable digital music devices such as the well known Apple iPod™ and iPad™, and other so-called "MP3 players", cellular telephones/smartphones, handheld computers, tablets such as the Kindle™ and Nook™ and iPad™, and personal digital assistants (PDA), which allow users to store and playback audio and video files.

Often, content which is provided to consumers is in some way linked or associated to a particular geographic location or region. For example, programming such as news broadcasts, advertisements, sporting events, is tied to the geographic location in which the content is broadcast. Even movies or other programs may have particular geographic relevance, such as where the story line or topic is in some tied to a geographic point of interest or locale.

Furthermore, contractual provisions between content sources and content providers indicate specific programming events which may be "blacked out" in certain geographic areas, or for which alternative programming is available depending on geographic area. For instance, a sporting event may be restricted to areas outside of the local market, so as to enhance ticket sales to the live event. Although the event is typically called a blackout event, the subscriber will be shown or directed to an alternate program.

In another example, certain so-called local programming (such as local advertisements or news broadcasts, or even emergency broadcasts) are substituted based on geographic location. The alternate program event is often based on a pre-determined time and negotiated program rights by the programmer.

However, the propagation of the aforementioned myriad of services and devices for receiving content, including various mobile devices (i.e., devices which are not fixed to a particular geographic location), creates significant obstacles to the enforcement of geographic restrictions on content. Such obstacles arise for example, because a typical content delivery network (CDN) is not physically tied to or associated with a given locality. Rather, a CDN serves a broad (even national) footprint, without knowledge of or adaptation to the particular geographic areas served.

There currently exists no mechanism for ensuring delivery of geographcially relevant content to IP-enabled mobile devices (or other devices not associated to a fixed location). Thus, what is needed is a system which is able to deliver the appropriate programming content based on locality of a mobile client device.

SUMMARY OF THE INVENTION

The present invention provides, inter alia, apparatus and methods for the delivery of geographically relevant content to IP-enabled devices including mobile devices.

In one aspect of the present invention, a method of delivering content that is gegraphically relevant to an IP-enabled client device is disclosed. In one embodiment, the method includes: obtaining content which has a geographic relevance associated therewith; receiving a request for the content from the client device, the client device having a geographic context associated therewith; generating a playlist for the requested content, the generated playlist having at least one trigger associated therewith; and providing the playlist to the client device for use by the client device in obtaining a redirection link based on the at least one trigger.

In another embodiment, the method includes: obtaining content; packaging a plurality of versions of the content, the plurality of versions each comprising respective triggers having different geographic contexts associated therewith; and providing the plurality of different versions to respective ones of IP-enabled user devices, the providing being based at least in part on geography-specific identification information associated with the respective client devices.

In a second aspect of the invention, an IP-enabled client apparatus configured to receive geographically relevant content is disclosed. In one embodiment, the apparatus is a mobile device and includes: a cellular or other wireless transceiver; a processor in signal communication with the transceiver; and logic in communication with the processor and configured to: receive content in the form of a playlist having one or more triggers associated therewith. The mobile apparatus reads the playlist including the one or more triggers, and uses one or more URLs or other links obtained using the playlist to obtain alternate content to the requested blacked out or geographically irrelevant content.

In another embodiment, the client apparatus is a mobile apparatus configured to receive IP media data via a content distribution network, and includes: a processor; a storage device in data communication with the processor, the storage device comprising a computer program configured to: generate a request for user-selected content for transmission to a first entity, the request including information which may be used by the first entity in determining a geographic context of the mobile apparatus; receive from the network a manifest or playlist for the user-selected content, the manifest or playlist including one or more markers; and utilize at least one of the one or more markers to access a second entity to obtain replacement or alternate content.

In a fourth aspect of the invention, a computer readable apparatus is disclosed. In one embodiment, the apparatus includes a storage medium having a computer program disposed thereon, the program configured to, when executed, provide a request for content including device identification information, the device identification information being useful in obtaining the geographic context of the device.

In a fifth aspect of the invention, a network architecture is disclosed, In one embodiment, the architecture is part of a managed content distribution network, and the architecture includes a geographic enforcement entity configured to determine the geographic context of requesting client devices, and enforce blackout or other programming restrictions on content requested by those devices based at least on the geographic context of the requesting device, In another embodiment, the geographic enforcement entity utilizes the geographic context of the device(s) to suggest geographically relevant content (e.g., advertisements or content particularly applicable to the location of the client device).

In a sixth aspect of the present invention, a method of delivering temporally relevant digital content to one or more computerized user devices in data communication with a digital content distribution network is disclosed. In one embodiment, the method includes: receiving data relating to a first request for first digital content from a first of the one or more computerized user devices, accessing temporal relevance data stored at a network storage device, the temporal relevance data comprising data relating to individual ones of a plurality of digital content, the first digital content being one of the plurality of digital content and having first temporal relevance data associated therewith determining, based at least in part on (i) the first temporal relevance data and (ii) data indicative of a then-current time, that access of the first digital content by the first of the one or more computerized user devices is not permitted; based at least in part on the determination, identifying alternate digital content; and enabling the first of the one or more computerized user devices to access the alternate digital content.

In a seventh aspect of the present invention, an apparatus for delivering of temporally permitted digital content to one or more computerized user devices of a digital content delivery network is disclosed. In one embodiment the apparatus includes: a data interface interface configured to communicate data with the one or more computerized user devices via the digital content delivery network; digital processor apparatus in data communication with the data interface; and storage apparatus in data communication with the digital processor apparatus, the storage apparatus configured to store at least one computer program thereon, the at least one computer program comprising a plurality of instructions which are configured to, when executed by the digital processor apparatus, cause the computerized network apparatus to receive data indicative of a request for insertion of second digital content into first digital content rendered at a first of the one or more computerized user devices; identify data indicative of a first time associated with the first of the one or more computerized user devices, based at least in part on the receipt of the data indicative of the request and the data indicative of the first time: access temporal relevance data stored at a network storage device, the temporal relevance data comprising data relating to individual ones of a plurality of digital content; identify at least one of the plurality of digital content having a first temporal relevance associated therewith, the first temporal relevance compatible with the first time; and enable the first of the one or more computerized user devices to access the at least one of the plurality of digital content having the first temporal relevance.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2b is a functional block diagram illustrating a portion of the exemplary network architecture of FIG. 2a.

FIG. 4a is a functional block diagram illustrating another exemplary embodiment of a network architecture, configured for delivery of geographically relevant content to an IP-enabled device using detailed scheduling information.

FIG. 4b is a functional block diagram illustrating a portion of the exemplary network architecture of FIG. 4a.

Figure 1:
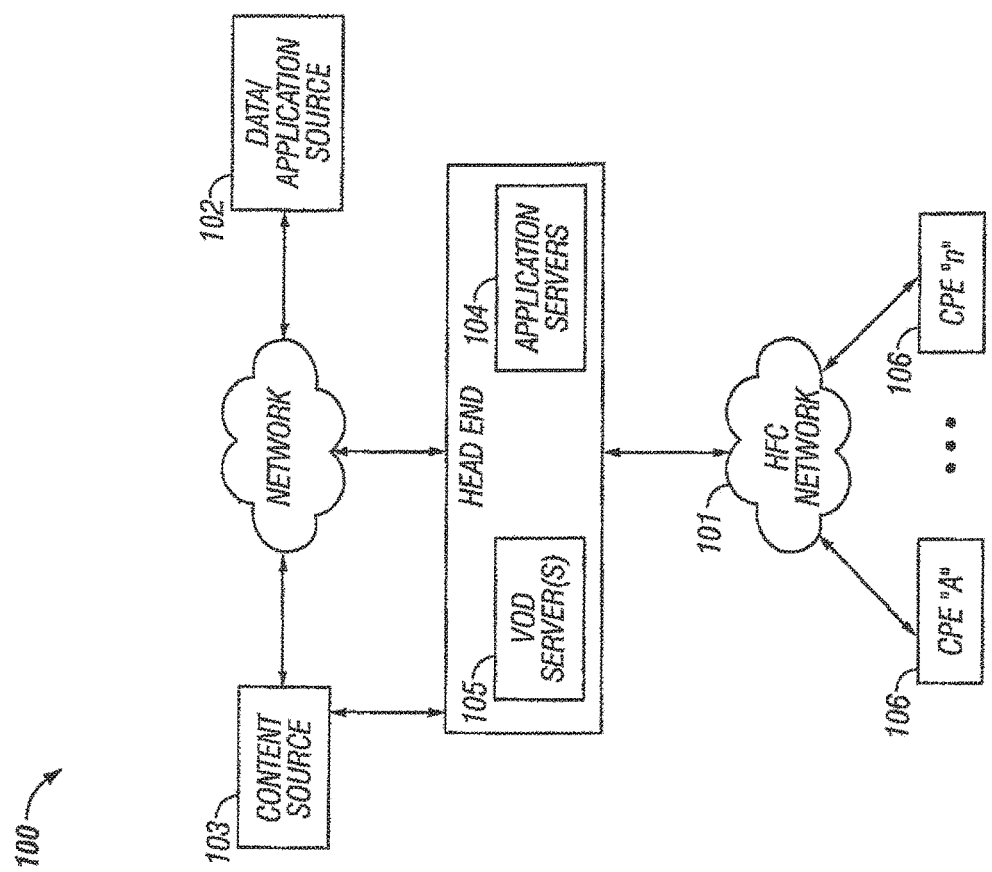
FIG. 1 is a functional block diagram illustrating an exemplary HFC cable network configuration useful with the present invention.

All Figures© Copyright 2012 Time Warner Cable, Inc. All rights reserved.

DETAILED DESCRIPTION OF THE INVENTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421 M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term gateway includes, without limitation, devices configured to interface with a network, and pass signals to or exchange signals with, another device in communication therewith. Various exemplary gateways are described in, inter alia, co-owned and co-pending U.S. patent application Ser. No. 11/818,236 filed on Jun. 13, 2007 entitled "PREMISES GATEWAY APPARATUS AND METHODS FOR USE IN A CONTENT-BASED NETWORK", U.S. patent application Ser. No. 12/582,619 filed on Oct. 20, 2009 and entitled "GATEWAY APPARATUS AND METHODS FOR DIGITAL CONTENT DELIVERY IN A NETWORK", and U.S. patent application Ser. No. 12/480,597 filed on Jun. 8, 2009 and entitled "MEDIA BRIDGE APPARATUS AND METHODS", each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G LTE/LTE-A/TD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers without limitation to either a group of service users (e.g. subscribers), or the resources shared by them in the form of for example entire cable RF signal, only the RF channels used to receive the service or otherwise treated as a single logical unit by the network for resource assignment.

As used herein, the term "Wi-Fi" refers to, without limitation, any of the variants of IEEE-Std. 802.11 or related standards including 802.11 a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present invention discloses methods and apparatus for ensuring delivery of geographically relevant content to IP-enabled devices in or associated with a content distribution network. In one embodiment, the geographic relevance of IP content having an adaptive bitrate which is provided to mobile devices (such as e.g., cellular telephones, laptop computers, tablet devices, etc.) and displayed using multimedia streaming communications protocols such as e.g., Apple® HTTP Live Streaming (HLS) or Microsoft® Smooth Streaming is ensured, and where the content is not relevant, alternate content is provided such as via one or more URLs given to the mobile device.

In another embodiment, the architecture disclosed herein provides a means for enforcing blackout and alternate program events for content programmers. One implementation of the system enables delivery of sports and other programming types over a content delivery or even unmanaged network (i.e., delivery to IP-enabled mobile devices) while maintaining geographic restrictions thereof.

Under a first exemplary paradigm, content providers are utilized to make match-ups between a user's geographic area and one or more content elements. In one embodiment, this is accomplished through use of a minimal data set (MDS).

In an alternate paradigm, the match-ups are accomplished through use of a more detailed ("verbose") data set processed by a headend or other network entity.

In yet another paradigm, elements of the forgoing MDS and verbose approaches are combined.

Additionally, the methods and apparatus disclosed herein flexibly allow client devices to be redirected to geographically relevant content (and away from geographically irrelevant or blacked out content) at both an initial tuning event and at an event which occurs during a current session or transmission.

Detailed Description of Exemplary Embodiments

Exemplary embodiments of the apparatus and methods of the present invention are now described in detail. While these exemplary embodiments are described in the context of the aforementioned managed network (e.g., a hybrid fiber/coax cable architecture) having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For example, the invention may be practiced over a fiber-to-the-home (FTTH) or fiber-to-the-curb (FTTC) system, HFCu networks, or over wireless, satellite or millimeter wave-based networks, as well as intranets and internets.

It will also be appreciated that while described generally in the context of a consumer (i.e., residential) end user domain, the present invention may be readily adapted to other types of environments (e.g., commercial/enterprise, government/military, etc.) as well. Myriad other applications are possible.

It is further noted that while exemplary embodiments are described primarily in the context of a hybrid fiber/conductor (e.g., cable) system with legacy 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Other features and advantages of the present invention will immediately be recognized by persons of ordinary skill in the art with reference to the attached drawings and detailed description of exemplary embodiments as given below.

Managed Content Delivery Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source (not shown).

The CPE 106 includes without limitation any equipment in the "customers' premises" (or other locations, whether local or remote to the distribution server 104) that can be accessed by a distribution server 104.

Figure 1A:
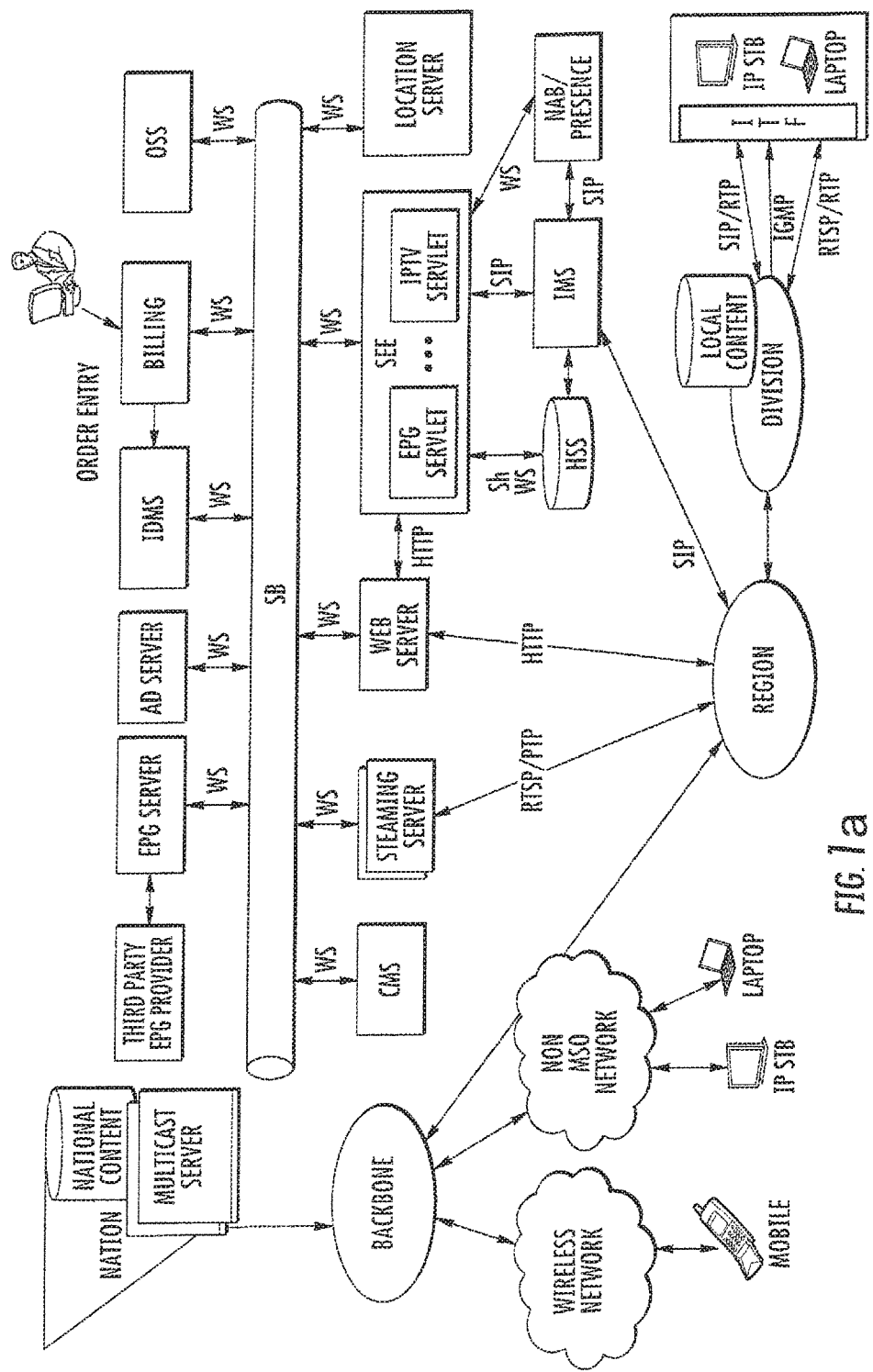
FIG. 1a is a functional block diagram illustrating one exemplary embodiment of a packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content) when the request issues from an MSO network. FIG. 1a illustrates one exemplary implementation of such a network, in the context of an IMS (IP Multimedia Subsystem) network with common control plane and service delivery platform (SDP), as described in co-pending U.S. patent application Ser. No. 12/764,746 filed Apr. 21, 2010 entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, etc.; however, it is appreciated that the various features of the present invention are in no way limited to any of the foregoing architectures.

Geographic Enforcement Architecture and Methods—

Figure 2:
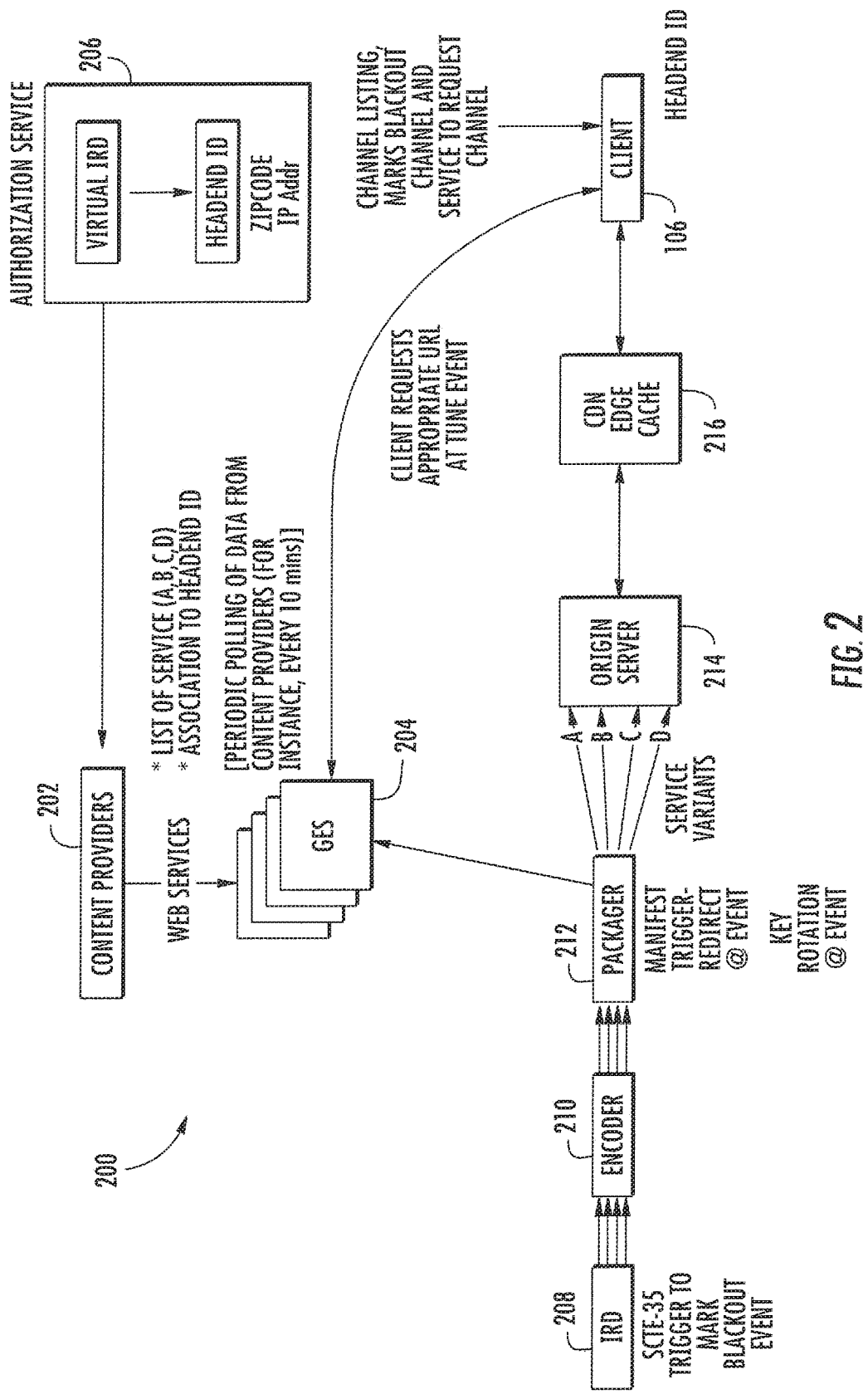
FIG. 2 is a functional block diagram illustrating one exemplary embodiment of network architecture for delivery of geographically relevant content to an IP-enabled device according to the present invention.

Referring now to FIG. 2, an exemplary embodiment of a network architecture 200 for delivery of geographically relevant content to an IP-enabled device is given.

Generally, an operator of a managed content delivery network such as those of FIGS. 1 and 1a above negotiates rights to content and related data with various content providers 202. Among these rights are rules designating content which is specific to a particular geographic region. This may include rules indicating certain geographic areas which are not to receive certain content (so called "blackouts"), as well as alternatively programming that these areas are supposed to receive. Other geographic content restrictions or guidelines may also be utilized.

As will be understood in the present context, the terms "geographic region" and "location" may refer to a given point of interest (e.g., ZIP code, account address, GPS coordinate, geographic feature, etc.), a broader region (such as a metropolitan area, state, territory, etc.), or even a relative geographic reference (e.g., an n-mile radius around around a fixed or moving reference point).

Moreover, the term "blackout" as used herein may refer to content which has temporal or other aspects as well as geographic ones. For example, programming may only be "blacked out" for a prescribed period of time (e.g., during certain weeks of the year, through the first half of a football game, up until a certain point in a local, state, or federal election, etc.), after which it is freely available for viewing.

It will also be appreciated that the geographic context or relationship of certain content may be a function of other variables or considerations, such as time. For instance, the geographic relevance or restrictions on a given content element may expire after a prescribed period, or after certain events occur, thereby making it freely available for distribution.

Moreover, a given content element itself may change its geographic relevance or context intra-element (i.e., one portion of the content element may be relevant to one location, and another portion to another location), such as where a travel-related program addresses different travel destinations, or a sports program switches between games at different locations or with teams originating from or associated with different locations.

Hence, the present invention contemplates not only the enforcement and delivery of "static" geographically relevant content (i.e., content whose relevance does not change), but also content with dynamically changing relevance or restrictions.

In one embodiment of the invention, the negotiated rights are implemented by the content provider 202. Accordingly, and as illustrated in FIG. 2, a minimal set of data (MSD) is provided by the content providers 202 to the geographic enforcement service (GES) 204. The set of data includes a headend identifier (or other device- or user-specific identifier) referenced to an alternative program. As will be described in greater detail below, the headend ID is used to identify a given requesting user device (e.g., mobile device) and associate it with a given geographic location or region.

In another embodiment, the rights are implemented at the GES 204, and thus a more detailed data set is provided (as will be discussed below with respect to FIGS. 4-5).

As shown in FIG. 2, the network 200 generally comprises a plurality of content providers 202 providing content and/or other webservices. The enforcement of geographic limitations is performed by a geographic enforcement service (GES) 204 which utilizes information obtained from the content providers, and an authorization service 206.

The GES 204 is further configured to manage content change-overs when restricted content is requested. As shown in FIG. 2, a receiver/decoder entity 208 of the network 200 receives content which is then encoded to an appropriate format (codec, bitrate, etc.) for the requesting device 106 at the encoder 210. The content contains a trigger which marks an event that is geographically restricted or otherwise of geographic interest. Triggering functions occur using in-band signaling. In one embodiment, the trigger comprises a Society of Cable Telecommunication Engineers (SCTE)-35 trigger of the type known in the art. Specifically, an SCTE-35 trigger is a cue message embedded in the transport stream which indicates an insertion event which is often used to, inter alia, indicate advertisement insertion points (see e.g., SCTE Standards Document ANSI/SCTE 118-2 2007 entitled "*Program-Specific Ad Insertion—Content Provider to Traffic Communication Applications Data Model*", which is incorporated herein by reference in its entirety). In the exemplary embodiment of the present invention, however, the SCTE-35 cue is maintained within the manifest or playlist, and is used to trigger a redirection event (described in greater detail below), although it will be appreciated that traditional SCTE-35 cues may be used in addition to those used for content redirection.

Still further, the packager may use the Placement Opportunity Interface Specification (POIS) as described by SCTE Standards Document ANSI/SCTE 130-1 2008 entitled "*Digital Program Insertion—Advertising Systems Interfaces*", which is incorporated herein by reference in its entirety, to signal to the alternate event service of alternate event notifications signaled via SCTE-35 triggers.

Encoded content is passed from the encoder 210 to the packager 212, where various service variants are generated and distributed to an origin server 214. The service variants created by the packager 212 correspond to the various services identified by the content providers 202. Thus, each service variant is, in the illustrated embodiment, provided a different playlist (or manifest) containing one or more triggers for varying content based on geographic restrictions or considerations associated to each service group. That is to say, the same content distributed to different geographic areas may have a different number of triggers, different placement of triggers, and/or comprise triggers referring to different "referred" content. In addition, certain service variants may have triggers embedded in the manifest which other variants may not have; this is the case, for example, when a particular content is "blacked out" in one geographic region, but not others.

When content is requested by the client 106, the request is serviced via the edge cache 216 which receives content from the origin server 214 discussed supra. Content may be stored at the edge 216 in order to facilitate delivery thereof with less latency than content delivered from the origin server 214 (or even deeper towards the core of the network). A content request from a client device 106 to the edge cache 216 in one implementation contains at least the headend ID (or other identifier) assigned to the device 106 by the authorization server 206. Alternatively, the MAC address or other device/user-specific identifier (e.g., IP address) which is associated with a known or determinable location may be utilized. The edge cache uses the identifier to ensure that the appropriate service variant is provided to the requesting device 106.

In another embodiment, the identifier of the device 106 may be linked to the physical location of the device at the time of the request. In one such implementation, the CPE 106 provides global positioning system (GPS) or other location data (e.g., association with or data from a wireless base station or access point/hotspot of known location, IP address, etc.) to the authorization server 206, which uses this information to assign a temporary headend ID (or other identifier). At each new request for content, GPS or other location data is provided and/or requested, and a new temporary headend ID is generated (if necessary).

During playback of the requested content according to the playlist thereof, the client may reach a trigger (such as a URL redirect trigger which is placed in a manifest at each instance of an SCTE-35 marker by the packager 212), indicating that content may no longer be provided, and/or alternate content is needed. The trigger event causes the CPE 106 to request an appropriate URL from the GES 204. The GES 204 consults a list of pre-designated alternative content provided by the content providers 202 to determine which URL (i.e., the URL for which content) should be transmitted to the device 106.

As will be discussed in greater detail elsewhere herein, other embodiments of the invention utilize an alternate events/content server to determine a geographic location of a requesting device based on information provided directly from the device, or by using a look-up system at the server. The look-up system may comprise for example a listing of geographic location to device associations based on e.g., subscriber account, IP address, etc.

Figure 2A:
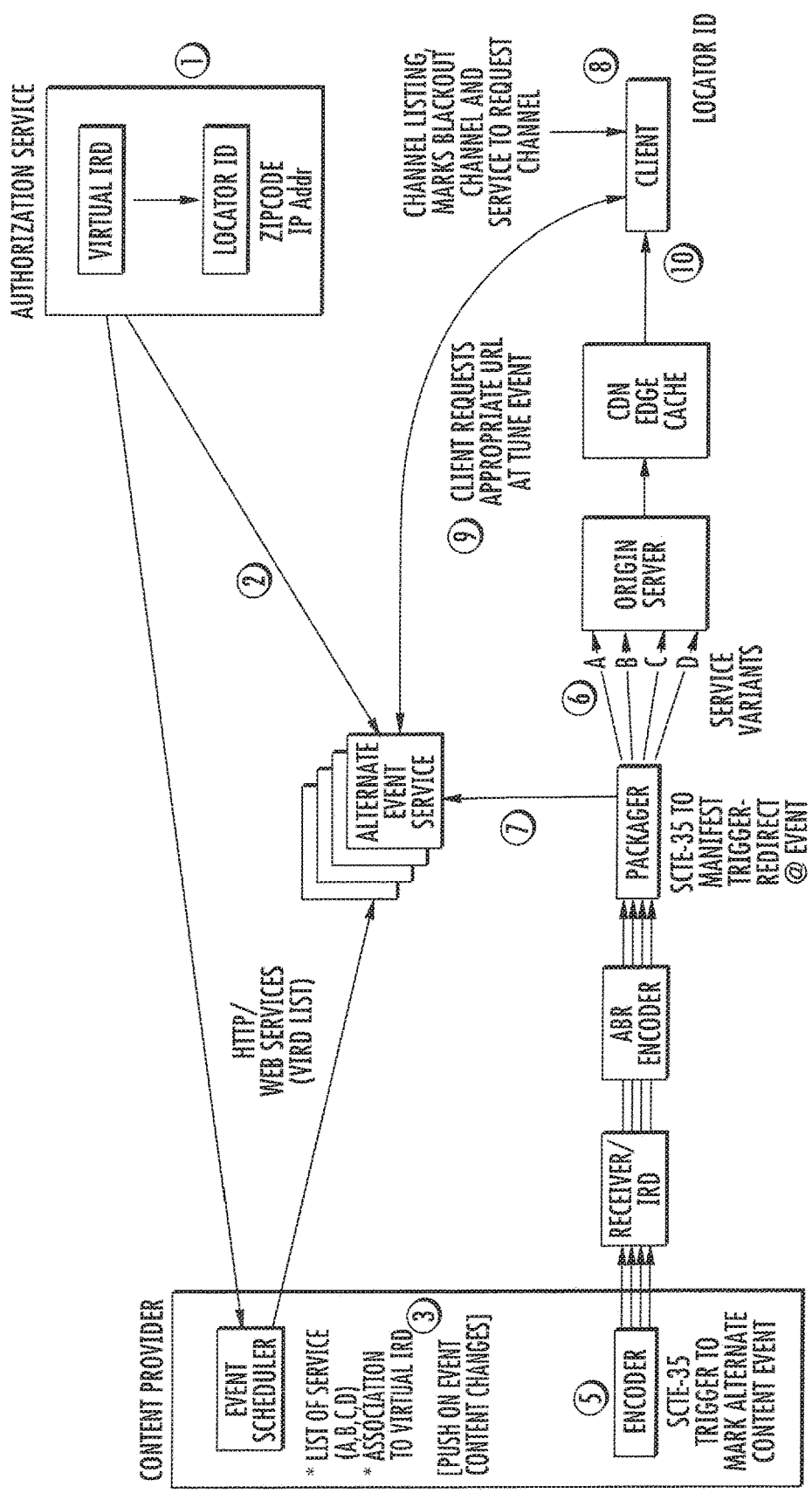
FIG. 2a is a functional block diagram illustrating another exemplary embodiment of network architecture, configured for delivery of geographically relevant content to an IP-enabled device using a virtual IRD.
Figure 2B:
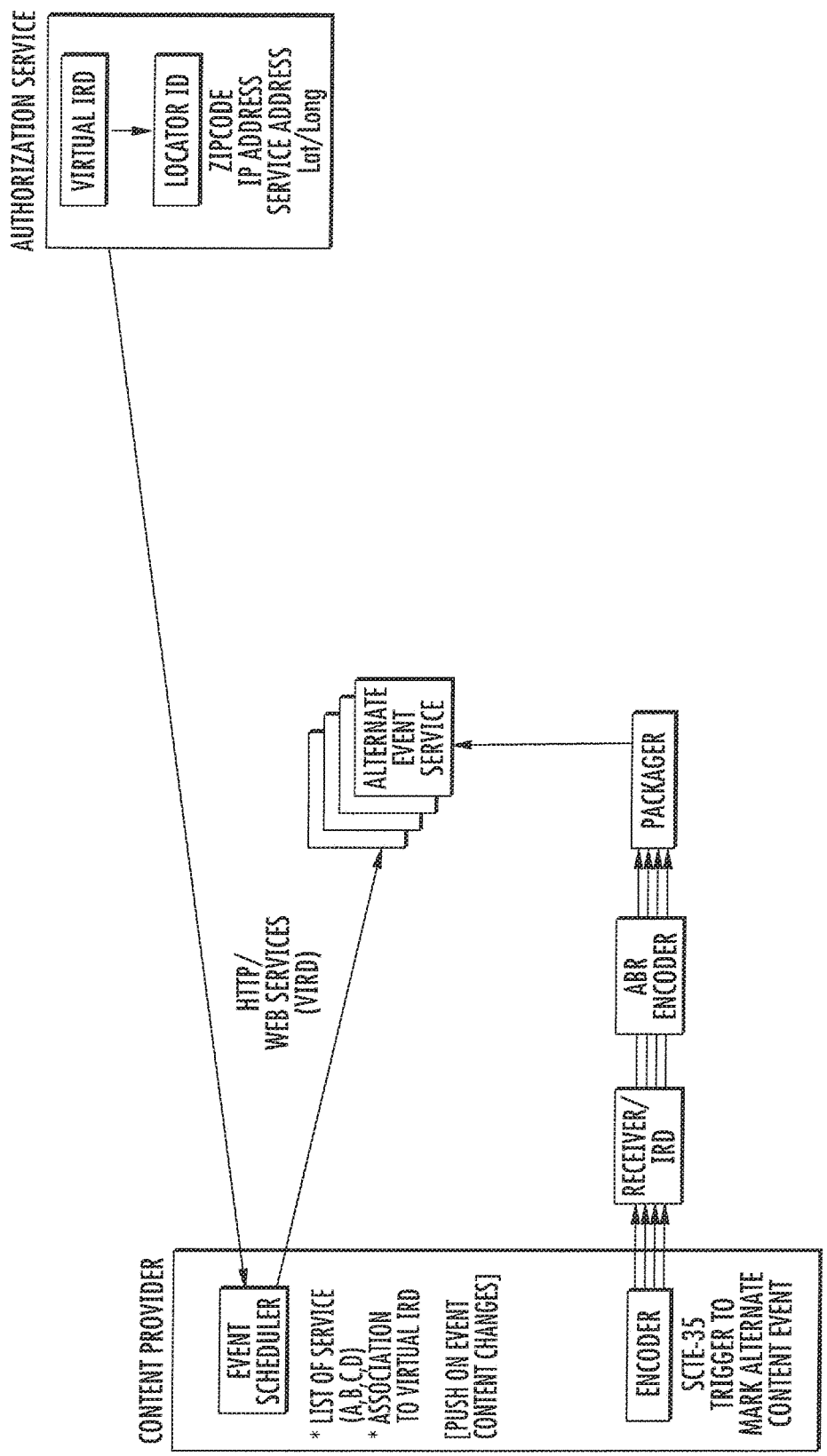

FIG. 2a illustrates another exemplary embodiment of network architecture configured for delivery of geographically relevant content to an IP-enabled device using a virtual IRD. As shown, the embodiment corresponds generally to that of FIG. 2 disussed above; however, in addition, the authorization service communicates directly to the alternate event service (AES) and to an event scheduler of the content provider to (i) associate a virtual IRD to a locator ID of the client devices, and (ii) to register the virtual IRDs to a given geographic area. The content provider of this embodiment further comprises an encoder configured to mark alternative content events such as via SCTE-35 triggers embedded in the content stream. The stream is then provided to the client devices, and upon reaching a trigger or other in-band marker of an alternate program event, alternate programming is requested from the alternate event server and appropriate URL are provided (as discussed above). FIG. 2b illustrates an exemplary configuration of the headend portion of the network architecture of FIG. 2a.

Figure 3:
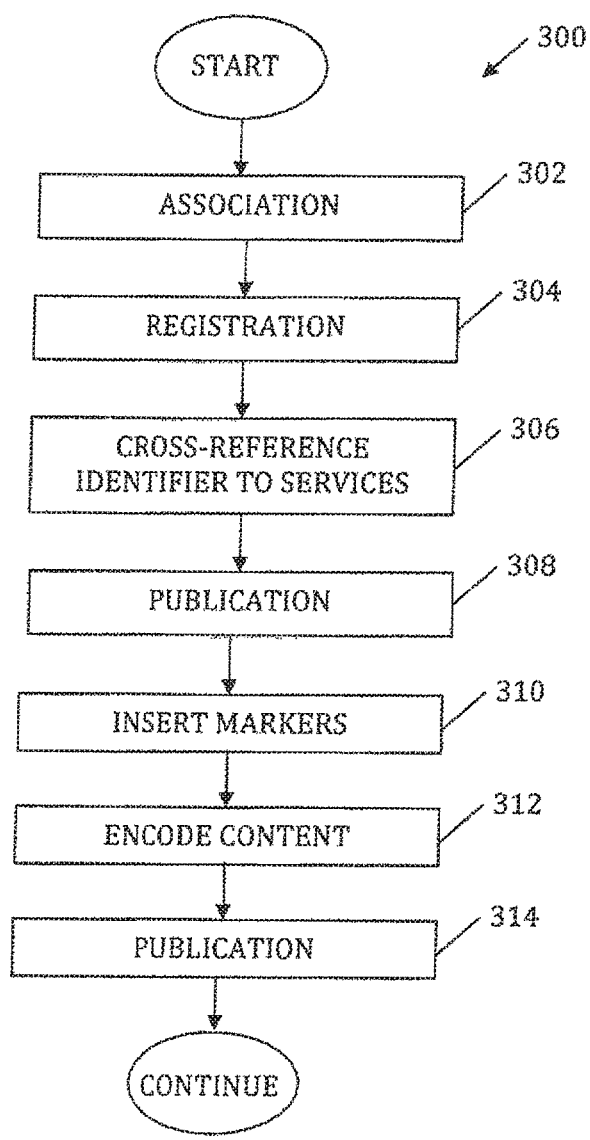
FIG. 3 is a logical flow diagram illustrating one embodiment of a method for providing geographically relevant content to an IP-enabled device via a content distribution network, such as the network of FIG. 2.

Referring now to FIG. 3, an exemplary embodiment of a method 300 for providing geographically relevant content to an IP-enabled device via a content distribution network, such as the exemplary network of FIG. 2 or 2a, is illustrated.

As shown, the method 300 comprises at step 302, an association process. During the association process, the "virtual IRD" (virtual integrated receiver/decoder) of the user device requesting access to content are associated to a headend identifier. The virtual IRD in one implementation includes a virtual construct of an IRD as a program provided from the provider. In a traditional blackout system, an IRD is shared across a geographic region; an authorization message is then sent to the regional IRD indicating a program stream suitable for that region. In this way, the IRD associates programs to a physical location. The virtual IRD of the present embodiment stands in the place of the traditional IRD to accept authorization messages for a particular geographic region. The virtual IRD, in one implementation, does not perform any other functions of a traditional IRD (such as receiving and/or decoding content), but merely helps maintain association of a program to a physical location. The authorization service 206 of the exemplary network 200 may be utilized to assign the headend identifier (headend ID) or other device or user-specific identifier.

Each device is assigned a headend ID (or other identifier) upon registration of the device to the network (step 304). Information including the headend ID (or other identifier), and other relevant information about the device and/or user, is also used to register a certain customers to a given geographic area.

In one embodiment, the registration process is similar to that discussed in co-owned U.S. patent application Ser. No. 13/403,802 filed Feb. 23, 2012 and entitled "APPARATUS AND METHODS FOR PROVIDING CONTENT TO AN IP-ENABLED DEVICE IN A CONTENT DISTRIBUTION NETWORK", which is incorporated herein by reference in its entirety. As discussed therein, in one variant, the registration process occurs at the first instance a subscriber attempts to access content via the herein described system. Alternatively, the subscriber may utilize a separate channel for registration, such as e.g., a website, call-in, etc. Registration may require creation of a login identity (such as a username) and password combination, although the present invention also contemplates use of other mechanisms for authenticating user and/or requesting device identity, including e.g., digital certificates, cryptographic hashes, key exchanges, biometric data relating to user, and so forth. Additionally, the login information (e.g., identity and password) may be linked to an existing subscriber account. It is appreciated, however, that other registration processes may be employed, the foregoing being merely illustrative of the overall concept of linking the particular subscriber account to the user/device requesting access. See, for example, co-owned U.S. patent application Ser. No. 11/440,490 filed May 24, 2006 entitled "PERSONAL CONTENT SERVER APPARATUS AND METHODS", now issued as U.S. Pat. No. 8,280,982 on Oct. 2, 2012, which is incorporated herein by reference in its entirety, which describes inter alia exemplary schemes for user registration and access to content from various locations.

When a new device 106 attempts to access content from the network by entering the login information, the identity assignment and registration process are performed. If the subscriber (or device) has previously been registered, the user may simply login to the content distribution network services, the system recognizes the device and acknowledges its previously assigned headend ID.

Once the user device is logged in (i.e., identified as belonging to a known subscriber), it is assigned a headend ID (or other identifier) as discussed above. The assigned identifiers of the newly registered devices are then provided from the authorization service 206 to the content providers 202.

Next, per step 306 of the method 300, the content provider 202 creates a cross-reference list of identifiers (such as headend IDs) to appropriate services based on negotiated viewing rights. Each available service is associated to a relevant geographic region (listed by e.g., zip code, area code, or other identifying information) via the assigned identifiers. The match between the assigned user device identifiers (e.g., headend IDs) and geographic regions (e.g., zip codes) may be performed at the authorization service 206, the GES 204, or the content providers 202. The service list may then be utilized to coordinate the assigned identifiers with specific services.

At step 308, the content provider 202 publishes the matchup of headend ID to particular programming for use by the GES 204. A new list is generated, in one embodiment, based on particular events (such as a user request), or periodically, or whenever an event notification is needed. The GES may also request or "pull" the list from the content provider(s). The list is published to the GES 204 in one embodiment using a WebServices interface, although other approaches may be used consistent with the invention.

At step 310 of the method, the content is marked with one or more markers or triggers. In one embodiment, the markers comprise SCTE-35 markers as discussed above, and indicate alternate program events. In one such implementation, the content provider 202 is responsible for marking events. Alternatively, the content provider 202 may merely provide necessary information to the GES 204, packager 212, or the origin server 214, and one of these entities may insert appropriate markers or triggers into the relevant events. As yet another alternative, the marker insertion task may be divided between the content providers and one or more other entities, such as based on a prescribed division scheme (e.g., content providers insert certain types of markers, while other entities insert others).

Next, per step 312, the content is encoded and published. In one embodiment, the content is encoded into hypertext transfer protocol (HTTP) format for provision to mobile devices using e.g., HLS or Smooth Streaming as discussed above. As the content is encoded (step 312), the SCTE-35 or otherwise marked alternate program event is converted by the packager 212 to a redirection URL in the manifest or playlist for the content which is ultimately published and stored on the origin server 214 or edge cache 216. The client device 106 plays the content from the manifest, when the redirect URL is encountered, it points the client to the GES 204.

At step 314, the GES 204 publishes one or more URLs for the appropriate content that will replace the requested content at the marked event. The GES 204 may obtain the correct redirect URL from the content providers 202 or, alternatively, the packager 212 may provide the URLs of the main and alternate programs to the GES 204. The GES 204 uses the URLs to create the associated service list with the appropriate URLs. In this instance, when the client device 106 encounters the event, and requests a redirect URL the GES 204 may consult the service list to redirect the device to the appropriate content.

In another variant, if encryption is occurring, the arrival of the playback device 106 at an alternate program event (i.e., at the redirection URL) may force a key change or rotation.

That is, if a key rotation event is forced, the device 106 will not be able to decrypt content until it has received an appropriate key. When the appropriate key is requested, the request is denied based on e.g., an evaluation of the requesting devices headend ID.

In one exemplary configuration, the MSO manages the keys, which are periodically rotated to inter alia, maintain their "freshness". The client devices request and receive a new key at the periodic rotation event. The key change or rotation ensures that the devices receiving content have not been de-authorized or are otherwise rendered ineligible to receive the key(s) within the rotation period. In one embodiment, the key(s) is/are held at a key server within the network (and managed by the MSO). The key server may utilize digital rights management (DRM) or another type of IP-based encryption system. A key management system (KMS) of the type well known in the cryptographic arts may be utilized to distribute the keys. Key rotation may occur dependent or independent of a geographic location of the requesting device; i.e., the keys may be issued predicated on a validated association with a location, or alternatively the user (or device) is validated irrespective of a location. The alternative event/content service is again utilized to determine where a client is located, and what content the device should receive based on that location, as discussed elsewhere herein.

Figure 4:
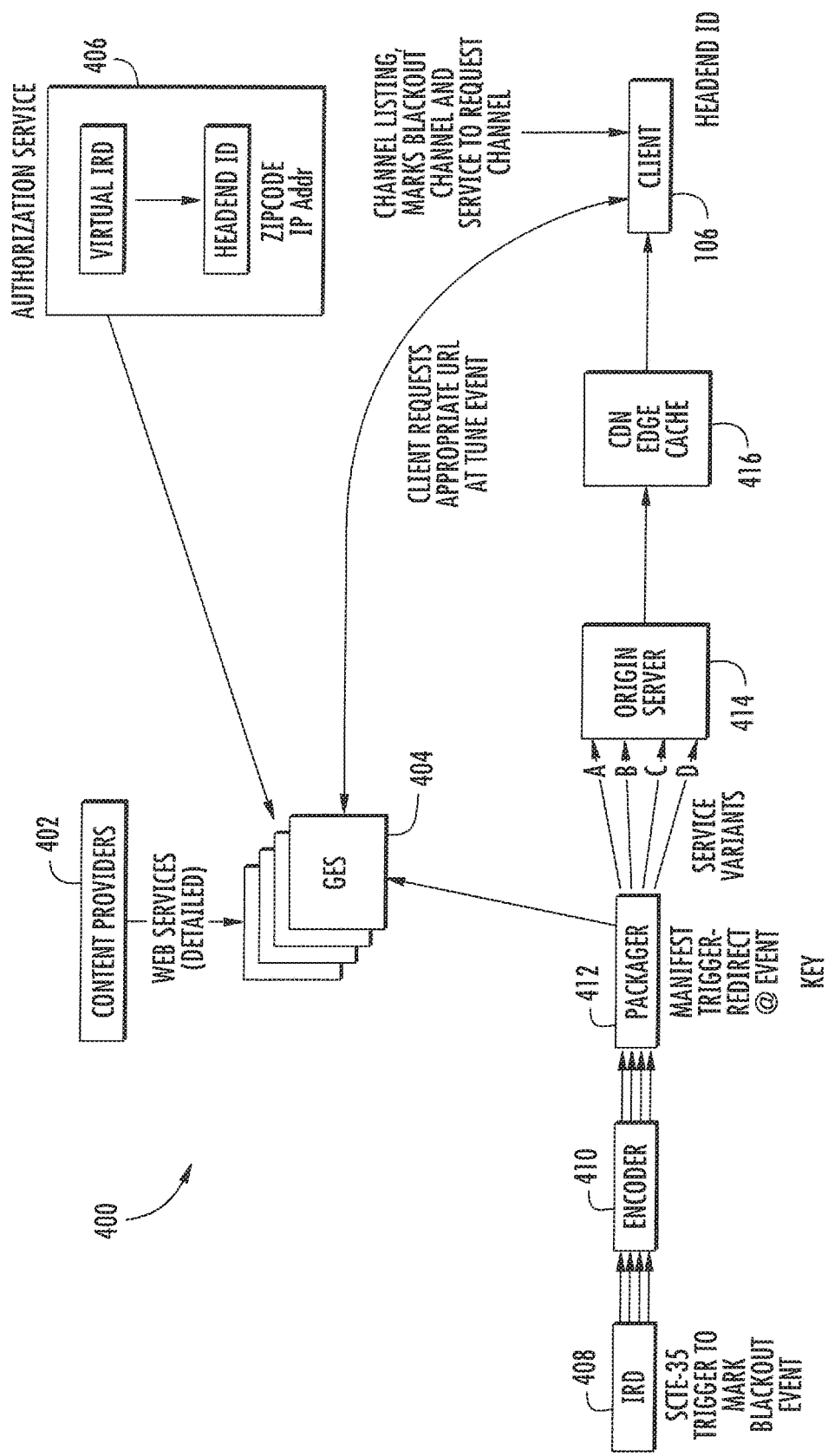
FIG. 4 is a functional block diagram illustrating another exemplary embodiment of a network architecture, configured for delivery of geographically relevant content to an IP-enabled device according to the present invention.

FIG. 4 illustrates another embodiment of the network architecture for delivery of geographically relevant content to an IP-enabled device according to the present invention. According to this embodiment, the pre-negotiated viewing rights of subscribers to the content of the content providers 202 are implemented at the GES 204 (rather than being implemented at the content providers 202, as discussed above with respect to FIGS. 2 and 3). In order to implement the negotiated rights, a more detailed or "verbose" data set is provided to the GES 204 from the content providers 202. In one embodiment, the information provided to the GES 204 from the content providers 202 includes a list of zip codes or other geographic identifiers referenced to an alternative programming content, as well as other information regarding a blackout or alternate programming event (such as when the event will occur, how long it will last, whether certain levels of subscribers may avoid a geographic restriction, descriptive matter relating to the alternate programming, etc.). Other information may be provided also, depending on the granularity of data available between the GES 204 and service provider 202.

The network 400 of FIG. 4 generally comprises a plurality of content providers 202 providing content and other web services. The enforcement of geographic limitations is performed by the GES 204 utilizing the information obtained from the content providers 202 and an authorization service 206. The GES 204 also manages content change-overs (i.e., provides alternative programming, such during a blacked-out event). The component portions of the network 400 include inter alia, a receiver/decoder entity 208, an encoder 210, and a packager 212, which cooperate to receive content, decode content, re-encode content, format the content for transmission to a client device 106 (including causing a playlist or manifest to be created), and provide the content to an origin server 214 (and eventually to an edge cache 216) for service to the client device 106.

The content in the illustrated embodiment contains a trigger which marks an event that is geographically restricted. In one implementation, the trigger comprises an SCTE-35 trigger, however other markers or indicators may be used with equal success. Each service variant is provided a different playlist (or manifest) containing triggers that indicate replacement content is to be inserted based on geographic restrictions associated to each service group.

The client device 106 requests content from the edge cache 216 or from the origin server 214. A request for content identifies the device 106 and/or the subscriber by providing e.g., the headend ID or other identifier assigned to the device by the authorization server 206. Alternatively, the MAC address or other pre-assigned device or user-specific identifier may be utilized. The identification of the device and/or subscriber via the identifier ensures that the appropriate service variant is provided to the device 106.

In another embodiment, the device 106 may be identified based on its current physical location, such as by utilizing GPS or other location data as previously set forth herein. A temporary headend ID (or other identifier) may be assigned based on the GPS or other data, and renewed at each new request for content.

In the network 400 embodiment of FIG. 4, when the client device 106 reaches a redirect URL or other trigger indicating a redirect event, the device 106 contacts the GES 204 for a new URL for the alternate programming content. Rather than consulting a list of pre-designated alternative content provided by the content providers 202 (as discussed in the embodiment of FIG. 2), the GES 204 uses information obtained from the content providers 202 to determine which URL (i.e., the URL for which content) should be transmitted to the device 106.

FIG. 4a illustrates another exemplary embodiment of network architecture configured for delivery of geographically relevant content to an IP-enabled device, here using detailed scheduling information. As shown, the embodiment corresponds generally to that of FIG. 4 disussed above; however, in addition, an event scheduler of the content provider provides detailed information to the alternate event service. The authorization service may then only communicate to the alternate event service to obtain information associating a locator ID of the client devices to respective geographic areas. The content provider of this embodiment further comprises an encoder configured to mark alternative content events (such as via SCTE-35 triggers embedded in the content stream). The stream is then provided to the client devices; upon reaching a trigger or other marker of an alternate program event, alternate programming is requested from the alternate event server, and appropriate URLs are provided (as discussed above). The embodiment of FIG. 4a may be further configured to utilize so-called "sparse tracks" for HTTP Smooth Streaming in the transmission of content from the packager to the origin server, and to identify alternative events. Sparse tracks are generally utilized to provide on-the-fly advertisement insertion to a live stream. In the context of present embodiment, the sparse tracks may be adjusted to instead provide a trigger for alternate content events. Other mechanisms for enabling triggering may also be utilized consistent with the present invention.

Figure 4B:
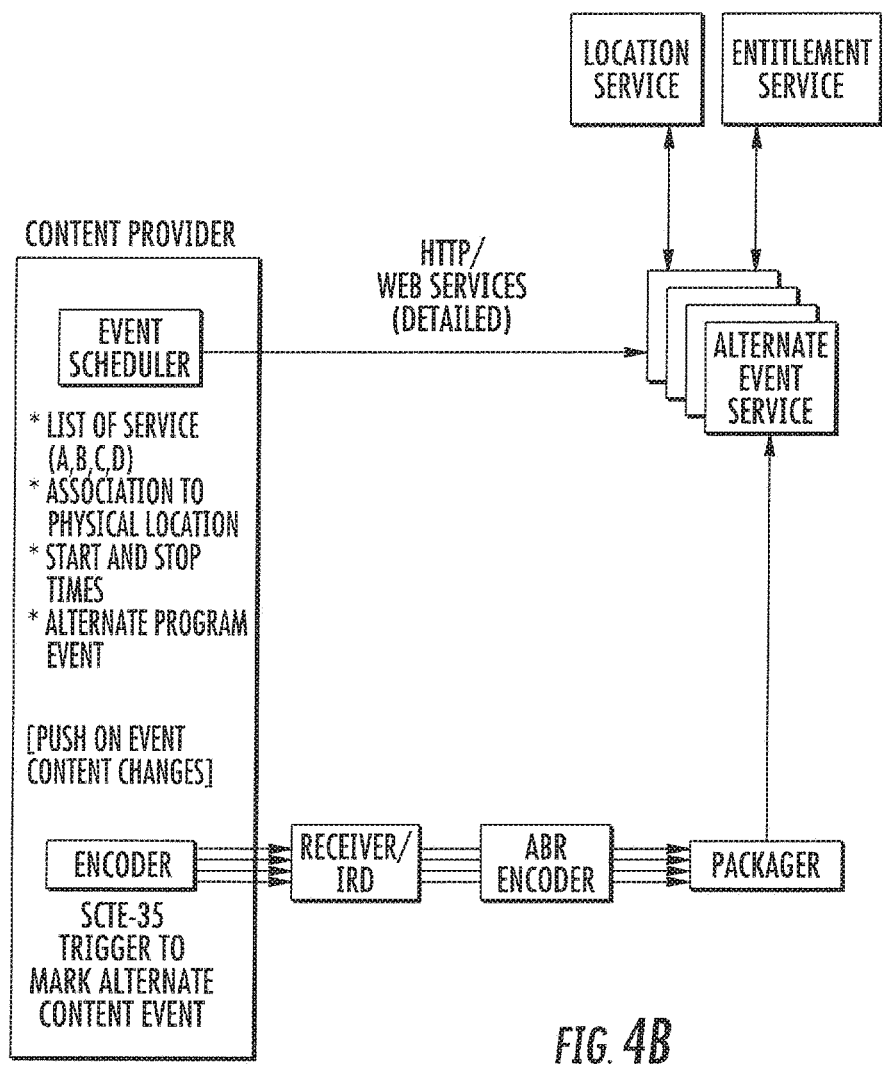

FIG. 4b illustrates an exemplary configuration of the headend portion of the network architecture of FIG. 4a.

Figure 4C:
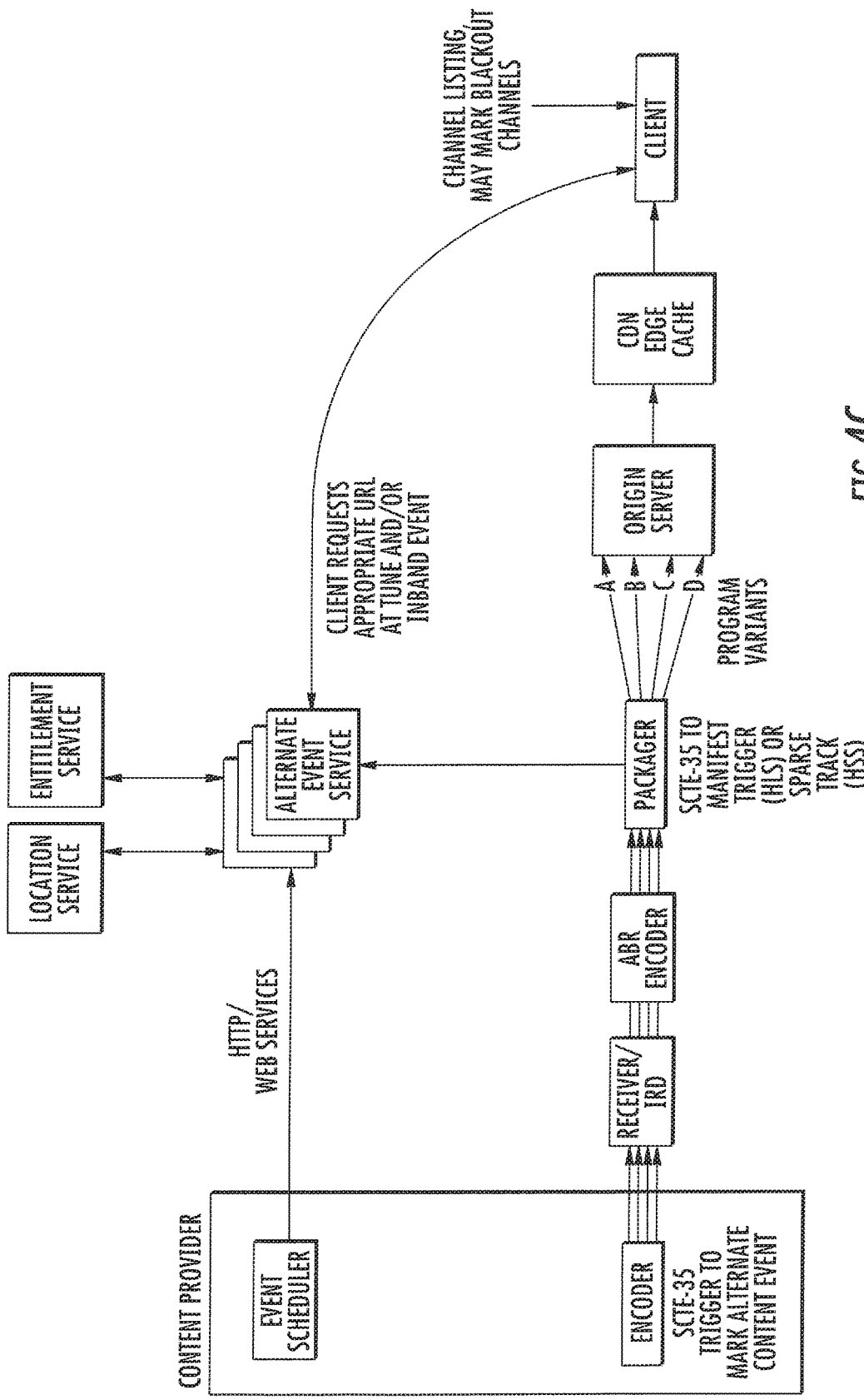
FIG. 4c is a functional block diagram illustrating another exemplary embodiment of a network architecture, configured for delivery of geographically relevant content to an IP-enabled device using detailed scheduling information and a location service and entitlement service.

FIG. 4c illustrates yet another exemplary embodiment of a network architecture configured for delivery of geographically relevant content to an IP-enabled device using detailed scheduling information. In contrast to that of FIG. 4a, this embodiment of the architecture obviates the authentication service in favor of a location service and entitlement service. The foregoing entities performing the functions of providing entitlements information to the alternate event service and associating geographic locations to client devices, as discussed above.

Figure 5:
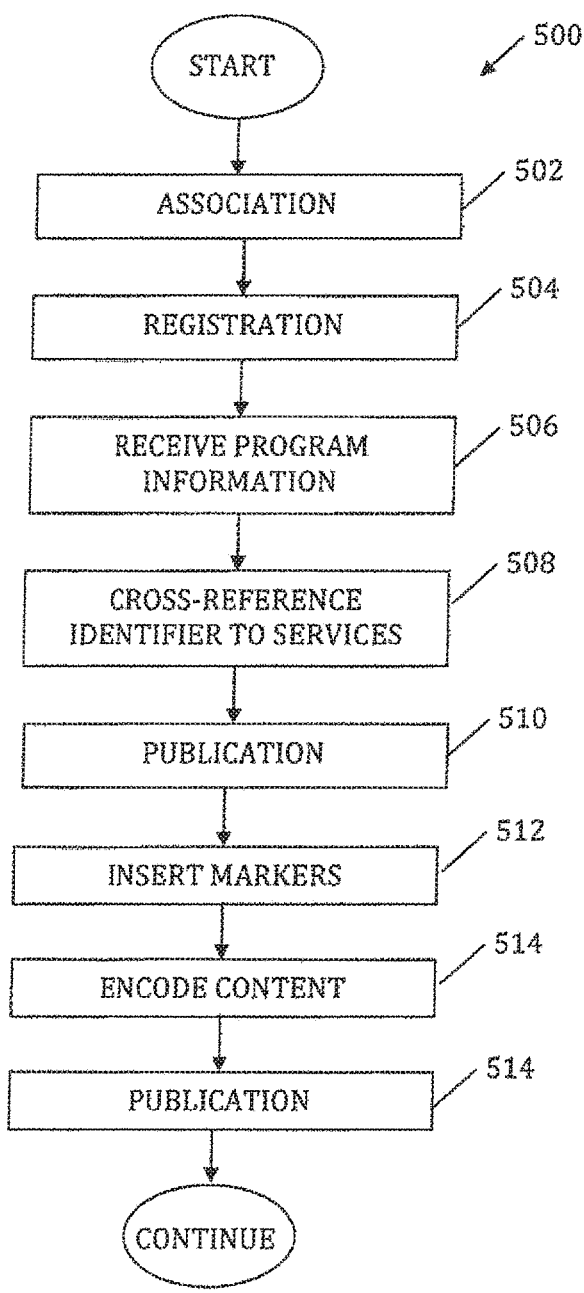
FIG. 5 is a logical flow diagram illustrating one embodiment of a method for providing geographically relevant content to an IP-enabled device via a content distribution network, such as the network of FIG. 4.

Referring now to FIG. 5, an exemplary method 500 for providing geographically relevant content to an IP-enabled device via a content distribution network, such as the exemplary network of FIG. 4 or 4a, is illustrated.

Per step 502 of the method 500, the authorization server 206 of the exemplary network 400 assigns a headend ID or other device and/or subscriber identifier to a "virtual IRD" of the client device 106. Alternatively, as noted above, the device and/or subscriber identifier may be a pre-assigned identifier such as e.g., MAC address. The identification information is used to register a certain set of customers in a given geographic area (see step 504). The listing is provided from the authorization server 206 to the GES 204.

Each device 106 is assigned a headend ID (or other identifier) upon registration of the device to the network (step 504). Information including the headend ID (or other identifier) and other relevant information about the device and/or user is also used to register a certain customers to a given geographic area. In one embodiment, the registration process is similar to that discussed in previously incorporated U.S. patent application Ser. No. 13/403,802 entitled "APPARATUS AND METHODS FOR PROVIDING CONTENT TO AN IP-ENABLED DEVICE IN A CONTENT DISTRIBUTION NETWORK", and generally includes creation of a login identity (such as a user name) and password combination. When a new device attempts to access content from the network by entering the login information, the identity assignment and registration process are performed. If the subscriber/device has previously registered, the user may simply login to the content distribution network services, the system recognizes the device and acknowledge its previously assigned headend ID, or otherwise provide sufficient authentication information. It will be appreciated that while the exemplary embodiments described herein discuss a "user" as logging in or registering with the various entities, the invention contemplates device-based logins/authentication as well, or combinations of the foregoing (e.g., the device being authenticated, such as by MAC, IP address, or other information, and the user of the device having to authenticate themselves (such as by user name/password, etc.).

As noted above, the headend ID (or other device or user specific identifiers) are provided from the authorization service 206 to the GES 204. The GES 204 creates a listing (or association table) of geographic areas (such as by zip code, area code, etc.), and associates each to the headend ID (or other identifier).

Next, per step 506, the content providers 202 provide program data or information to the GES 204. In one embodiment, the program information identifies: (i) when a blackout or alternate programming event is to occur, (ii) alternate programming options for the blackout or alternate programming event, and (iii) the geographic areas and/or subscribers or subscriber types which are/are not permitted access to particular content.

At step 508, the GES 204 uses this information and the previously assembled association table to identify URLs for the appropriate main and alternate programs during an alternate programming event; the GES 204 cross-references a list of identifiers (such as headend IDs) to appropriate services based on negotiated viewing rights. Each available service is associated to a relevant geographic region (listed by e.g., zip code, area code, etc.) via the assigned identifiers. The cross-referenced list is utilized to coordinate the assigned identifiers to specific services.

As discussed above, the content provider may also provide an association of virtual IRDs to particular programming, such as via a list or other data structure. The association list may be provided periodically, when an event notification is needed (e.g., based on a client action or request), or under other conditions as required. In one embodiment, the herein-discussed web services interface is utilized to publish the list, although other mechanisms may be used with equal success.

Next per step 510, the content is marked with one or more markers or triggers (such as e.g., the previously discussed SCTE-35 markers), which indicate alternate program events. The content provider 202 may mark the events or, alternatively, the GES 204 or packager 212 may mark the events using information received from the content provider 202.

At step 512, the content is encoded and published. In one embodiment, the content is encoded into HTTP format for provision to mobile devices 106 using e.g., HLS or Smooth Streaming as discussed above. Encoding the content includes conversion of the SCTE-35 or otherwise marked alternate program event by the packager 212 to a redirection URL. The redirection URL is listed in the manifest or playlist for the content, which is ultimately published and stored on the origin server 214 and/or edge cache 216. During playback of the content, when the client device 106 encounters a redirect URL, the device 106 is referenced to the GES 204. The GES 204 provides the appropriate URL upon the redirection.

Next, at step 514, the GES 204 publishes URLs for the appropriate content to replace the requested content at the marked event.

In yet another variant, the arrival of the playback device 106 at an alternate program event (i.e., at the redirection URL) may force a key rotation. As discussed above, the key rotation event causes the device 106 to no longer be able to decrypt content (until it has received an appropriate key) and thereby assists in a geographic content restriction. In other words, when the appropriate key is requested by the device 106 after a key change event, access is denied based on e.g., an evaluation of the requesting devices headend ID and instead the device 106 is referred to the alternate program URL.

In yet another embodiment, certain ones of the content providers 202 (or other entities) are tasked with determining alternative programming, and generating the content list matching geographic areas to content (as discussed in FIGS. 2 and 3 above). At the same time, other content providers 202 within the same network provide the necessary information for enabling the GES 204 to perform the geographic area to content match ups (as discussed in FIGS. 4 and 5). Accordingly, the GES 204 is in one embodiment configured to act in place of the content providers 202 for determining appropriate content when necessary, but is also configured to merely use information provided by the content providers 202 when necessary. The necessity of the GES 204 to perform one or the other function is determined by negotiated rights between the managed network 200 or 400 and the content providers 202.

User Tuning Methods—

Figure 6:
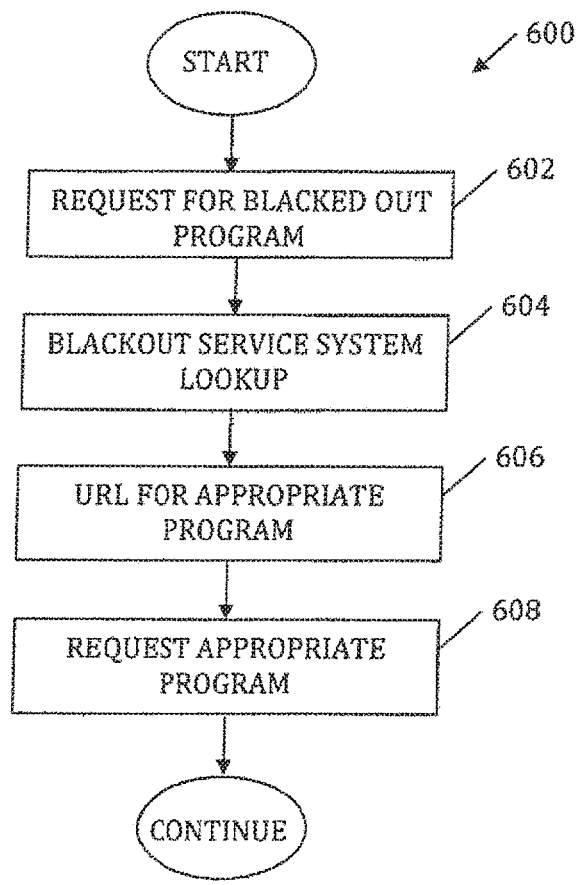
FIG. 6 is a logical flow diagram illustrating one embodiment of a method for ensuring that an initial tune request for content yields geographically relevant content.

FIG. 6 is a logical flow diagram illustrating an exemplary embodiment of a method 600 for ensuring an initial tune request for content yields geographically relevant content.

Per step 602 of the method, the client device 106 requests content which is geographically inappropriate for the requesting device.

When the client device 106 receives a channel listing, the list indicates which programs or channels are blacked-out and/or have alternative programming provided. The client selects a program from the channel listing, and if the program is a among the programming or channels that is potentially blacked-out or for which alternative programming is to be provided, it is determined whether the content is appropriate to the geographic area associated to the requesting device. This determination is based in one implementation on the headend ID (or other identifier), which is provided in the request to the GES 204. It is also noted that the identifier may be based on the current location of the device or a location to which the device or subscriber is registered, or yet other data.

At step 604, the GES 204 performs a search of the association table to match the subscriber or device specific identifier to a geographic region and determine whether the requested program is in the identified region. The system next identifies and returns the URL for the appropriate program (which may be the requested program or alternative programming) to the CPE 106 at step 606.

Lastly, per step 608, the client device 106 requests the appropriate program according to the URL delivered thereto. The client will then use this URL to begin watching the program.

Figure 7:
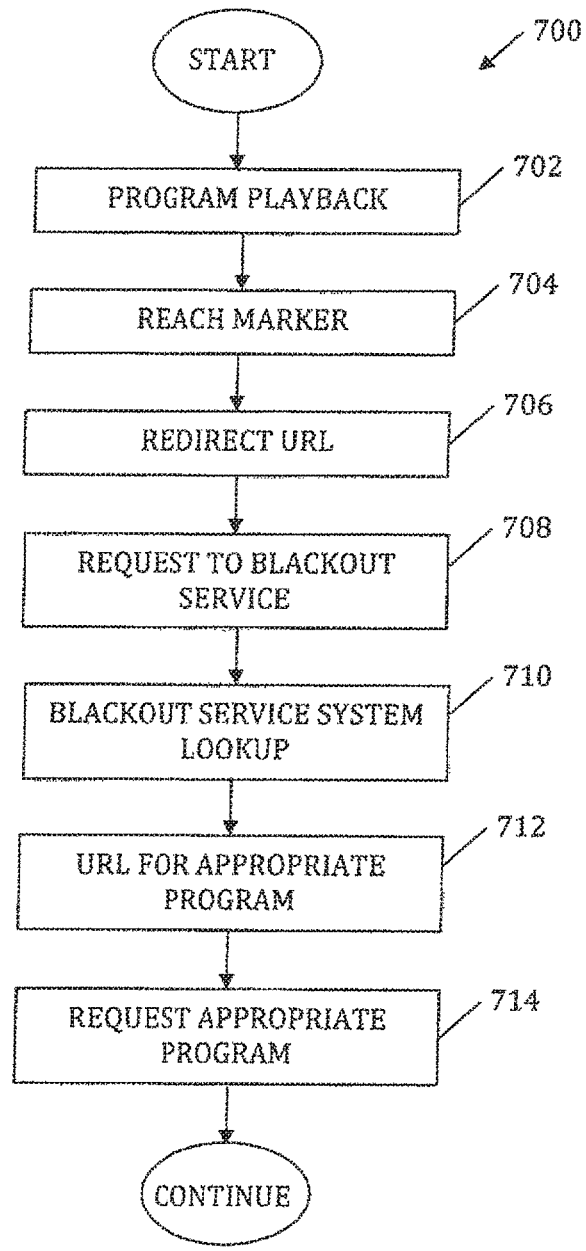
FIG. 7 is a logical flow diagram illustrating an exemplary method for ensuring that an in-band transition event yields geographically relevant content.

Referring now to FIG. 7, an exemplary embodiment of a method 700 for ensuring an in-band transition event yields geographically relevant content is shown and described.

Per step 702, a program is in progress when an event marker is reached (step 704). At this point in the manifest, a redirect URL is given (step 706). The redirect URL causes the CPE 106 to make a new request to the GES 204 (step 708).

At step 710, the GES 204 determines appropriate content for the geographic area of the CPE 106 based on the headend ID or other identifier provided to the GES 204 in the request for content. As noted above, the identifier may be based on the current location of the device or a registered location or subscriber account. The system next identifies and returns the URL for the appropriate program (which may be the requested program or alternative programming) to the CPE 106 at step 712. Per step 714, the client device 106 requests the appropriate program according to the URL delivered thereto. The client will then use this URL to begin streaming and watching the program.

Geographic Enforcement Service (GES) Apparatus—

Figure 8:
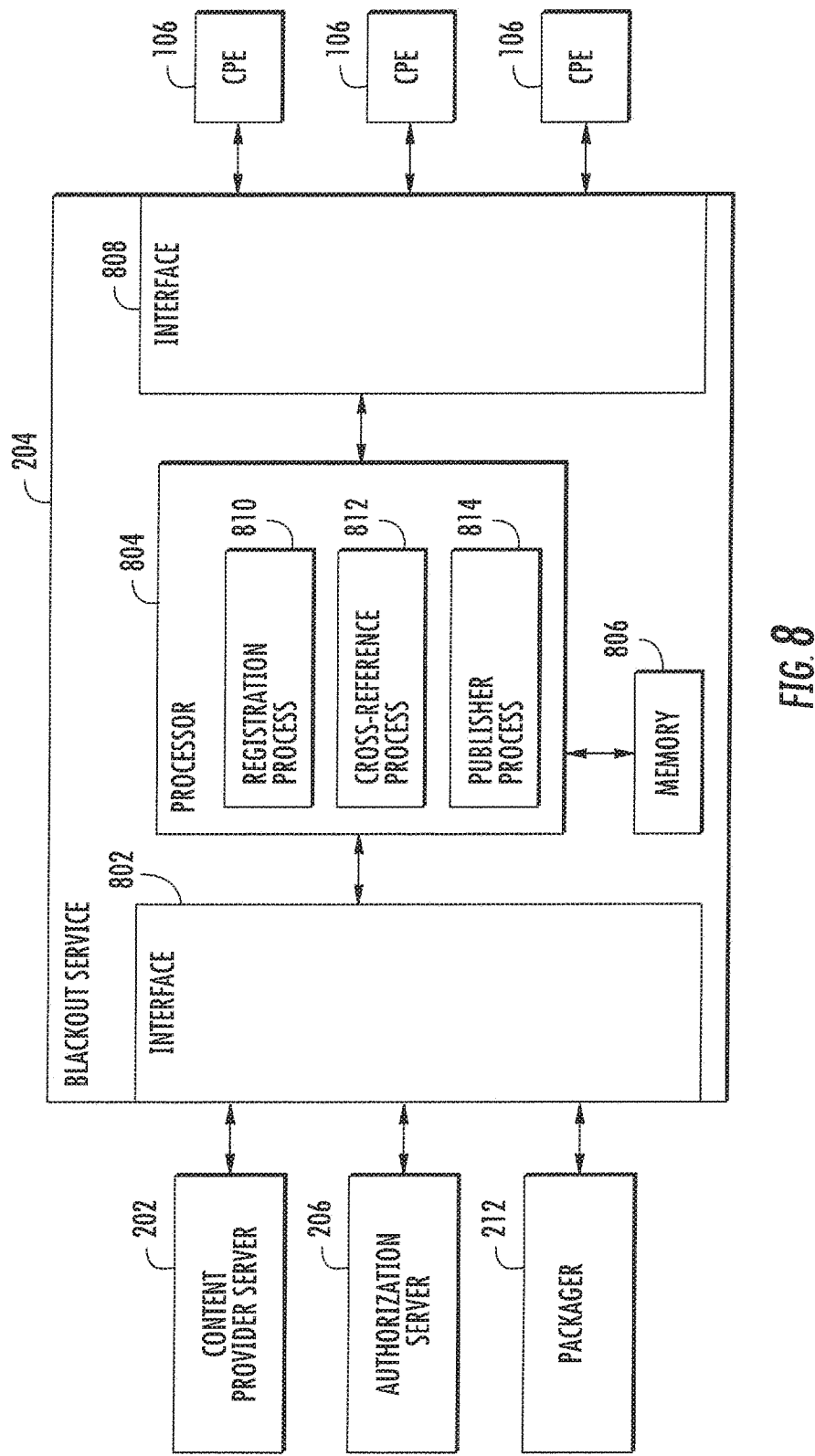
FIG. 8 is a functional block diagram illustrating an exemplary embodiment of an apparatus configured to ensure delivery of geographcially relevant content to a plurality of IP-enabled devices in a content delivery network.

FIG. 8 is a functional block diagram illustrating one exemplary embodiment of a geographic enforcement service (GES) entity 204 which ensures delivery of geographcially relevant content to a plurality of IP-enabled devices in a content delivery network.

As shown, the GES 204 generally comprises an interface 802 for communication to one or more content providers 202, an authorization server 206, and a packager 212. In a first embodiment, the GES 204 receives a list of device or subscriber identifiers correlated to appropriate programming from the content providers 202 (see discussion of FIGS. 2 and 3 above) for storage in a storage device (e.g., HDD or memory) 806. In another embodiment, the GES 204 receives information enabling the GES 204 itself to correlate programming to devices/subscribers (see discussion of FIGS. 4 and 5 above) at e.g. the cross-reference process 812 running on the processor 804 of the GES 204.

Additionally, the exemplary configuration of the GES 204 includes a registration process 810 and a publisher process 814. The registration process 810 facilitates registration of devices 106 from the authorization server 206. The publisher process 814 publishes one or more URLs for appropriate programming to requesting devices 106 when these devices reach a redirect URL in the playback of requested content. Interface 808 enables communication between the GES 204 and the client devices 106.

The GES 204 is in the illustrated embodiment designed to be highly scalable, and can service requests to all CPE 106 in communication therewith. That is to say, it is able to handle large bursts of (substantially contemporaneous) requests. In one implementation, a load balancer is utilized to balance requests across multiple servers which are distributed across the geographic footprint. In addition, multiple servers may be provided per market location, in order to accommodate large incoming requests.

Although not illustrated, the GES 204 may further comprise a look-ahead feature. The look-ahead feature enables the GES 204 to review the playlists or manifests of content currently viewed on registered CPE 106, and determine a priori which streams will require alternative programming, and cue the appropriate programming. According to this model, the GES 204 once it has determined the upcoming change-over events, staggers or otherwise randomizes delivery of the alternate content URLs. In this manner, the overall impact or burden to the GES 204 at any given alternate programming event will be spread across a larger time period, as opposed to occurring simultaneously. In one embodiment, this may be accomplished using an interface to provide alternate event scheduling information in advance of the actual event. In one variant, the interface may comprise XML, via HTTP (or HTTP-S) to a hosted RESTful interface (scheduling proxy).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized network apparatus configured for enabling delivery of permitted digital content to one or more computerized user devices in a digital content distribution network, the computerized network apparatus comprising:

a data interface apparatus configured to communicate data with the one or more computerized user devices via the digital content distribution network;

digital processor apparatus in data communication with the data interface apparatus; and storage apparatus in data communication with the digital processor apparatus, the storage apparatus configured to store at least one computer program thereon, the at least one computer program comprising a plurality of instructions which are configured to, when executed by the digital processor apparatus, cause the computerized network apparatus to:
receive data indicative of at least one of a playlist or a manifest of digital content for delivery to a first computerized user device of the one or more computerized user devices;
based at least in part on the receipt of the data indicative of the at least one of the playlist or the manifest of digital content:
identify data indicative of a first location, the first location associated with the first computerized user device;
identify data indicative of a future time of playback of the at least one of the playlist or the manifest of digital content at the first computerized user device; and
identify that one or more digital content elements within the at least one of the playlist or the manifest of digital content are not permitted to be accessed by the first computerized user device at the future time of playback;
based at least in part on the identification that one or more digital content elements within the at least one of the playlist or the manifest of digital content are not permitted to be accessed by the first computerized user device at the future time of playback:
access stored relevance data, the stored relevance data correlating individual ones of a plurality of digital content with each of (i) temporal relevance data, and (ii) geographic relevance data;
identify a first portion of the plurality of digital content, the first portion comprising individual digital content elements each having (i) first temporal relevance data and (ii) first geographic relevance data associated therewith, the first temporal relevance data compatible with the future time and the first geographic relevance data compatible with the first location; and
provide one or more redirection links within the at least one of the playlist or the manifest, the one or more redirection links each configured to (i) enable access by the first computerized user device to one or more of the individual digital content elements of the first portion of the plurality of digital content, and (ii) disable access of the identified one or more digital content elements that are not permitted to be accessed by the first computerized user device at the future time of playback.

2. The computerized network apparatus of claim 1, wherein the first temporal relevance data comprises data indicative of a prescribed period of time within which the individual digital content elements of the first portion of the plurality of digital content are not permitted to be rendered; and
the identification of the individual digital content elements of the first portion of the plurality of digital content at least in part comprises a determination that the future time is not within the prescribed period of time.

3. The computerized network apparatus of claim 1, wherein the first geographic relevance data comprises data indicative of a prescribed geographic region within which the individual digital content elements of the first portion of the plurality of digital content are not permitted to be rendered; and the identification of the individual digital content elements of the first portion of the plurality of digital content at least in part comprises a determination that the first location is not within the prescribed geographic region.

4. The computerized network apparatus of claim 1, wherein the first temporal relevance data comprises data indicative of a prescribed period of time within which the individual digital content elements of the first portion of the plurality of digital content are not permitted to be accessed, and the first geographic relevance data comprises a prescribed geographic region within which the first temporal relevance is applicable; and
the identification the individual digital content elements of the first portion of the plurality of digital content at least in part comprises a determination that (i) the first location is within the prescribed geographic region and (ii) the future time is not within the prescribed period of time.

5. The computerized network apparatus of claim 1, wherein the plurality of instructions are further configured to, when executed by the digital processor apparatus, cause the computerized network apparatus to limit access by the first computerized user device to the individual digital content elements of a second portion of the plurality of digital content, each of the individual digital content elements of the second portion of the plurality of digital content having (i) second temporal relevance data and (ii) second geographic relevance data associated therewith, at least one of the second temporal relevance data being incompatible with the first time or the second geographic relevance data being incompatible with the first location; and
wherein the enablement of access by the first computerized user device to the one or more individual digital content elements of the first portion of the plurality of digital content comprises provision of a redirection URL within the at least one of the playlist or the manifest for each of the one or more of the individual digital content elements of the first portion of the plurality of digital content.

6. The computerized network apparatus of claim 1, wherein the first temporal relevance data comprises data indicative of a blackout period within which the individual digital content elements of the first portion of the plurality of digital content are not permitted to be accessed, and the first geographic relevance data comprises a prescribed geographic region within which the blackout period is applicable; and
the identification the individual digital content elements of the first portion of the plurality of digital content at least in part comprises a determination that (i) the first location is within the prescribed geographic region and (ii) the future time occurs one of before or after the blackout period.

7. The computerized network apparatus of claim 1, wherein the plurality of instructions are further configured to, when executed by the digital processor apparatus, cause the computerized network apparatus to cause staggered delivery of each of the one or more of the redirection links via the data interface using one of XML (extensible markup language), HTTP (hypertext transfer protocol), or HTTPS (hypertext transfer protocol secure).

8. The computerized network apparatus of claim 1, wherein the plurality of instructions are further configured to, when executed by the digital processor apparatus, cause the computerized network apparatus to cause randomized delivery of each of the one or more of the redirection links via the data interface using one of XML (extensible markup language), HTTP (hypertext transfer protocol), or HTTP-S (hypertext transfer protocol secure).

9. The computerized network apparatus of claim 1, wherein the plurality of instructions are further configured to, when executed by the digital processor apparatus, cause the computerized network apparatus to balance the identified first portion of the plurality of digital content across multiple servers distributed a in the geographic footprint.

10. The computerized network apparatus of claim 1, wherein the plurality of instructions are further configured to, when executed by the digital processor apparatus, cause the computerized network apparatus to identify a device identifier associated with at least one of the one or more computerized devices;
wherein the first portion of the plurality of digital content is assigned based on the device identifier.

11. The computerized network apparatus of claim 1, wherein the plurality of instructions are further configured to, when executed by the digital processor apparatus, cause the computerized network apparatus to:
access content provider information data;
utilize content provider information data to identify a plurality of digital content; and
provide at least one redirection link within the playlist configured to supply the plurality of digital content.

12. The computerized network apparatus of claim 11, wherein the plurality of instructions are further configured to, when executed by the digital processor apparatus, cause the computerized network apparatus to access at least one of subscriber data or subscriber type data;
utilize the at least one subscriber data or subscriber type data to identify a plurality of digital content; and
provide at least one redirection link configured to supply the plurality of digital content.

13. The computerized network apparatus of claim 1, wherein the plurality of instructions are further configured to, when executed by the digital processor apparatus, cause the computerized network apparatus to:
identify that one or more digital content elements within the at least one of the playlist or the manifest of digital content have: (i) first temporal relevance data, and (ii) first geographic relevance data associated therewith, the first temporal relevance data not compatible with the future time or the first geographic relevance data compatible with the first location; and
provide a marker for the identified one or more digital content elements within the at least one of the playlist or the manifest of digital content, the marker indicating the identified one or more digital content elements as comprising non-permitted data.

14. A computerized network apparatus configured for enabling delivery of permitted digital content to one or more computerized user devices in a digital content distribution network, the computerized network apparatus comprising:
a data interface apparatus configured to communicate data with one or more computerized user devices within a specified geographic region via the digital content distribution network;
digital processor apparatus in data communication with the data interface apparatus; and
storage apparatus in data communication with the digital processor apparatus, the storage apparatus configured to store at least one computer program thereon, the at least one computer program comprising a plurality of instructions which are configured to, when executed by the digital processor apparatus, cause the computerized network apparatus to:
receive data indicative of a future time of playback of at least one of a playlist or manifest of digital content at one or more computerized user devices within the specified geographic region; and
determine that one or more digital content elements within the at least one playlist or manifest of digital content are not permitted to be accessed by the one or more computerized user devices at the future time of playback; and
based at least in part on the determination:
access relevance data, the relevance data correlating individual ones of a plurality of digital content with temporal relevance data;
identify a first portion of the plurality of digital content, the first portion comprising individual digital content elements each having respective first temporal relevance data associated therewith, the respective first temporal relevance data indicating that the respective individual digital content elements are each compatible with the future time; and
provide at least one redirection link within the at least one playlist or manifest, the at least one redirection link configured to: (i) enable access to one or more of the individual digital content elements of the first portion of the plurality of digital content for the one or more computerized devices at the future time of playback; and (ii) disable access of the identified one or more digital content elements that are not permitted to be accessed by the one or more computerized devices at the future time of playback.

15. The computerized network apparatus of claim 14, wherein:
the first temporal relevance data comprises data indicative of a prescribed period of time within which the individual digital content elements of the first portion of the plurality of digital content are not permitted to be accessed; and
the determination at least in part comprises a determination that the future time is not within the prescribed period of time.

16. The computerized network apparatus of claim 14, wherein the plurality of instructions are further configured to, when executed by the digital processor apparatus, cause the computerized network apparatus to limit access by the first computerized user device to the individual digital content elements of a second portion of the plurality of digital content, each of the individual digital content elements of the second portion of the plurality of digital content having respective second temporal relevance data associated therewith, the respective second temporal relevance data indicating that the respective individual digital content elements are each incompatible with the future time; and
wherein the enablement of access by the first computerized user device to the one or more individual digital content elements of the first portion of the plurality of digital content comprises provision of a redirection URL (universal resource locator) within the at least one of the playlist or the manifest for each of the one or more of the individual digital content elements of the first portion of the plurality of digital content.

17. The computerized network apparatus of claim 14, wherein:

the first temporal relevance data comprises data indicative of a blackout period within which the individual digital content elements of the first portion of the plurality of digital content are not permitted to be accessed; and the determination at least in part comprises a determination that the future time occurs at one of: before the blackout period, or after the blackout period.

18. A computerized network apparatus configured for enabling delivery of permitted digital content to one or more computerized user devices in a digital content distribution network, the computerized network apparatus comprising:

a data interface apparatus configured to communicate data with the one or more computerized user devices via the digital content distribution network;

digital processor apparatus in data communication with the data interface apparatus; and storage apparatus in data communication with the digital processor apparatus, the storage apparatus configured to store at least one computer program thereon, the at least one computer program comprising a plurality of instructions which are configured to, when executed by the digital processor apparatus, cause the computerized network apparatus to:

receive data indicative of a listing of digital content configured for delivery to the one or more computerized user devices;

based at least in part on the data indicative of the listing of digital content:

identify data indicative of a first location, the first location associated with the one or more computerized user devices;

identify data indicative of a future time of playback of the listing of digital content at the one or more computerized user devices; and identify at least one digital content element within the listing of digital content having: (i) first temporal relevance data, and (ii) first geographic relevance data, associated therewith, at least one of the first temporal relevance data and the first geographic relevance data indicating that the at least one digital content element is not compatible with the future time, or the at least one digital content element is not compatible with the first location, respectively;

provide marker data for the identified at least one digital content element within the listing of digital content, the marker data indicating that the at least one digital content element is non-permitted for access by the one or more computerized user devices at the future time of playback; and based at least on the marker data:

disable access to the identified at least one digital content element by the first computerized user device at the future time of playback; and provide one or more redirection links within the listing, the one or more redirection links each configured to enable access by the first computerized user device to the at least one digital content element.

19. The computerized network apparatus of claim 18, wherein the wherein the plurality of instructions are further configured to, when executed by the digital processor apparatus, cause the computerized network apparatus to:

identify alternate programming, the alternate programming comprising individual digital content elements each having (i) first temporal relevance data and (ii) first geographic relevance data associated therewith, the first temporal relevance data of the individual digital content elements indicative that the respective individual digital content element is compatible with the future time, and the first geographic relevance data of the individual digital content elements indicative that the respective individual digital content element is compatible with the first location; and provide one or more redirection links to the alternate programming within the listing.

20. The computerized network apparatus of claim 18, wherein:

the first geographic relevance data comprises respective data indicative of a prescribed geographic region within which the respective individual digital content elements of the first portion of the plurality of digital content is not permitted to be rendered; and the identification of the individual digital content elements of the first portion of the plurality of digital content at least in part comprises a determination that the first location of each of the individual digital content elements is not within the prescribed geographic region.

21. The computerized network apparatus of claim 18, wherein:

the first temporal relevance data comprises respective data indicative of a prescribed period of time within which the respective individual digital content element of the first portion of the plurality of digital content is not permitted to be rendered; and the identification of the individual digital content elements of the first portion of the plurality of digital content at least in part comprises a determination that the future time of each of the individual digital content elements is not within the prescribed period of time.

22. The computerized network apparatus of claim 14, wherein: the first temporal relevance data comprises data indicative of a prescribed period of time within which the individual digital content elements of first portion of the plurality of digital content are not permitted to be accessed; and the determination at least in part comprises a determination that the future time is not within the prescribed period of time.

* * * * *